United States Patent
Swartz et al.

(10) Patent No.: US 10,967,577 B2
(45) Date of Patent: Apr. 6, 2021

(54) METHOD AND APPARATUS FOR POWDER SYSTEM RECYCLER FOR PRINTING PROCESS

(71) Applicant: Impossible Objects, Inc., Northbrook, IL (US)

(72) Inventors: Robert Swartz, Highland Park, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 171 days.

(21) Appl. No.: 15/922,158

(22) Filed: Mar. 15, 2018

(65) Prior Publication Data
US 2018/0264732 A1 Sep. 20, 2018

Related U.S. Application Data

(60) Provisional application No. 62/473,129, filed on Mar. 17, 2017.

(51) Int. Cl.
*B29C 64/357* (2017.01)
*B29C 64/141* (2017.01)
(Continued)

(52) U.S. Cl.
CPC .......... *B29C 64/357* (2017.08); *B29C 64/141* (2017.08); *B29C 64/329* (2017.08);
(Continued)

(58) Field of Classification Search
CPC .................................................. B29C 64/357
See application file for complete search history.

(56) References Cited

U.S. PATENT DOCUMENTS

| 3,431,166 A | 3/1969 | Mizutani |
| 4,312,268 A | 1/1982 | King et al. |

(Continued)

FOREIGN PATENT DOCUMENTS

| CN | 101181776 A | | 5/2008 |
| GB | 190408431 A | * | 5/1904 |

(Continued)

OTHER PUBLICATIONS

Maharashtra Industries Directory. "Double Flap Valve". Belt Conveyors, Belt Conveyor Systems, Flat Belt Conveyor, Cleated Belt Conveyors, Mumbai, India, Apr. 3, 2016, web.archive.org/web/20160403230227/www.digidaleconveyors.com/double-flap-valve.htm ("Digidale") (Year: 2016).*

(Continued)

*Primary Examiner* — Marc C Howell
*Assistant Examiner* — John J Derusso
(74) *Attorney, Agent, or Firm* — Flachsbart & Greenspoon, LLC; Robert Greenspoon

(57) ABSTRACT

A method and powder system component of an apparatus for use in a printing process is disclosed, and for removing and recycling excess powder. The powder system results in a cutoff point of 3 microns rather than 50 microns of previous systems. The apparatus comprises a powder applicator, a powder remover, a helical cyclone, a powder collector, and two valves that alternately open and close. The two-valve system prevents air backflow. The powder is processed through the two-valve system. The method comprises: valve 1 is closed and powder accumulates; valve 2 is closed also; after valve 1 opens, powder goes through (there is no air backflow), then valve 1 closes; then valve 2 opens and allows powder onto a powder applicator; then valve 2 closes; then the cycle starts again.

12 Claims, 26 Drawing Sheets

(51) Int. Cl.
  *B29C 64/329* (2017.01)
  *B33Y 30/00* (2015.01)
  *B33Y 40/00* (2020.01)
  *B33Y 10/00* (2015.01)
  *B29K 101/12* (2006.01)

(52) U.S. Cl.
  CPC ............... *B33Y 10/00* (2014.12); *B33Y 30/00* (2014.12); *B33Y 40/00* (2014.12); *B29K 2101/12* (2013.01)

(56) References Cited

U.S. PATENT DOCUMENTS

| | | | |
|---|---|---|---|
| 4,393,389 A | 7/1983 | Rasekhi et al. | |
| 4,453,694 A | 6/1984 | Andreasson | |
| 4,592,191 A * | 6/1986 | Simington | B65B 11/52 53/282 |
| 4,863,538 A | 9/1989 | Deckard | |
| 5,176,949 A | 1/1993 | Allagnat et al. | |
| 5,204,055 A | 4/1993 | Sachs et al. | |
| 5,260,009 A | 11/1993 | Penn | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,637,175 A | 6/1997 | Feygin et al. | |
| 5,876,550 A | 3/1999 | Feygin et al. | |
| 5,988,959 A | 11/1999 | Sugata | |
| 6,147,138 A | 11/2000 | Hochsmann et al. | |
| 6,161,995 A | 12/2000 | Wakazono et al. | |
| 6,471,800 B2 | 10/2002 | Jang et al. | |
| 6,551,038 B1 | 4/2003 | Sugata et al. | |
| 6,596,224 B1 | 7/2003 | Sachs et al. | |
| 6,632,054 B2 | 10/2003 | Geiger et al. | |
| 6,740,185 B2 | 5/2004 | Baldwin | |
| 6,780,368 B2 | 8/2004 | Liu et al. | |
| 7,435,368 B2 | 10/2008 | Davidsen et al. | |
| 8,377,547 B2 | 2/2013 | Noguchi et al. | |
| 2001/0045678 A1 | 11/2001 | Kubo et al. | |
| 2002/0104935 A1 | 8/2002 | Schweizer | |
| 2004/0070582 A1 | 4/2004 | Smith et al. | |
| 2004/0084814 A1 | 5/2004 | Boyd et al. | |
| 2004/0112523 A1 | 6/2004 | Crom et al. | |
| 2005/0059757 A1 | 3/2005 | Bredt et al. | |
| 2006/0061618 A1 | 3/2006 | Hernandez et al. | |
| 2007/0241482 A1 | 10/2007 | Giller et al. | |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0044903 A1 * | 2/2010 | Rhoades | B22F 3/26 264/69 |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2011/0211016 A1 | 9/2011 | Davidson et al. | |
| 2012/0059503 A1 | 3/2012 | Pax et al. | |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0339645 A1 | 11/2016 | Swartz et al. | |
| 2017/0299074 A1 * | 10/2017 | Masaki | F16K 1/2028 |
| 2019/0054696 A1 * | 2/2019 | Alonso | B33Y 40/00 |

FOREIGN PATENT DOCUMENTS

| | | |
|---|---|---|
| JP | H11236541 | 8/1999 |
| WO | WO-2007114895 A2 | 10/2007 |
| WO | WO-2013010108 A1 | 1/2013 |
| WO | WO-2013033273 A2 | 3/2013 |
| WO | WO-2014134224 A2 | 9/2014 |
| WO | WO2015025171 A2 | 2/2015 |
| WO | WO2016046539 A2 | 3/2016 |

OTHER PUBLICATIONS

International Search Report for PCT/US12/52946 ("Methods and Apparatus for 3D Fabrication"), dated Jan. 10, 2013.
J. Eltgen, A Short Review of Magnetography and Its Related Materials Problems, Ind. Eng. Chem. Prod. Res. Dev., vol. 24, No. 2, 1985, pp. 196-201.
Extended European Search Report, from EP Application No. 12828967 (EP20120828967) ("Methods and Apparatus for 3D Fabrication"), dated Jun. 9, 2015.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.
Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.
Non-Final Rejection in U.S. Appl. No. 14/566,661 ("Tow Stabilization Method and Apparatus"), dated Mar. 21, 2017.
Applicant Initiated Interview Summary in U.S. Appl. No. 14/703,372 (". . . Flattened Substrate Sheets"), dated Feb. 9, 2017.
Invitation to Pay Additional Fees for International Application No. PCT/US17/17672 ("Method/Apparatus Automated Composite-Based Additive Manufacturing"), dated Apr. 17, 2017.
Non-Final Rejection in U.S. Appl. No. 13/582,939 ("Methods and Apparatus for 3D Fabrication"), dated Apr. 27, 2017.
Decision on Protest for PCT/US17/17672 ("Method and Apparatus for Automated Composite-Based Additive Manufacturing"), dated May 26, 2017.
Final Rejection in U.S. Appl. No. 14/190,912 ("Methods and Apparatus for Construction of Machine Tools"), dated Jun. 13, 2017.
Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 (". . . Metal Matrix Composites . . . "), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.

(56) References Cited

OTHER PUBLICATIONS

Non-Final Rejection in U.S. Appl. No. 14/190,912 ("Methods and Apparatus for Construction of Machine Tools"), dated Oct. 3, 2016.
International Search Rpt and written opinion PCT/US18/226740, dated Jul. 24, 2018.

* cited by examiner

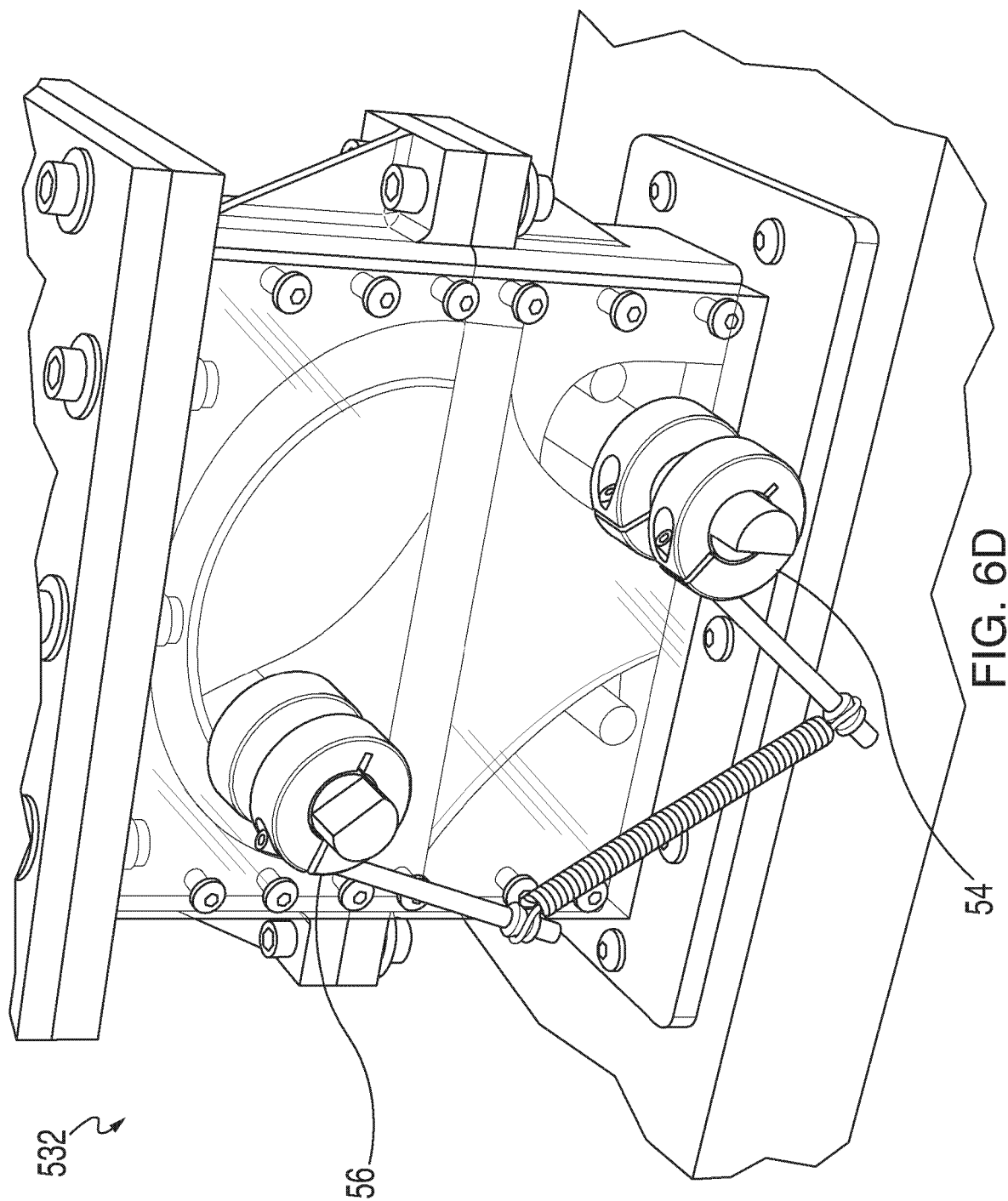

METHOD AND APPARATUS FOR POWDER SYSTEM RECYCLER FOR PRINTING PROCESS

This application claims the benefit of U.S. Provisional Application No. 62/473,129, filed Mar. 17, 2017, which application is hereby incorporated by reference in its entirety.

TECHNICAL FIELD OF THE INVENTION

The present invention relates to a powder system recycler for a printing process, with specific application to additive manufacturing and, in particular, to an apparatus that is a powder system recycler component of an apparatus for automated manufacturing of three-dimensional composite-based objects.

BACKGROUND OF THE INVENTION

Additive manufacturing, such as three-dimensional printing, can be seen as largely a materials science problem. One of the limitations of current methods is a limited materials palette and slow build speeds.

These and other limitations of the prior art are avoided by a methodology known as Composite-Based Additive Manufacturing (CBAM). CBAM is described in full in co-pending U.S. patent application Ser. No. 13/582,939, filed Nov. 2, 2012, Ser. No. 14/835,690, filed Aug. 25, 2015, and Ser. No. 14/835,635, filed Aug. 25, 2015, each of which is incorporated fully herein by reference.

International application no. PCT/US17/17672, filed Feb. 13, 2017 and U.S. application Ser. No. 15/611,320, filed Jun. 1, 2017, describe a particular method and apparatus for automating Composite-Based Additive Manufacturing (CBAM). International application no. PCT/US17/17672 and U.S. application Ser. No. 15/611,320 are incorporated fully herein by reference.

An original powder recycler used in the CBAM process had a cutoff point of 50 microns (that is, it would not recycle particles less than 50 microns). The powder recycler comprised a trough that would deposit powder onto substrate sheets (where the powder would stick to wetted regions on the sheets, the wetted regions corresponding to a layer image of a 3D object), a vacuum for removing excess powder and a recycler for recycling the excess powder using a dump valve to return the excess powder back into the trough. Due to the cutoff point of 50 microns, the device would recycle only those particles that were 50 microns or larger, while particles smaller than 50 microns would get discarded.

The particles used by the inventors of the present application in the CBAM process have a typical mean size in the range of 50 microns, with a distribution of larger and smaller particles, but the process is not limited to these sizes and can be used with many different particle mean sizes and distributions. Thus, using the original powder recycler, many particles (that is, those below 50 microns) were being discarded and thus wasted. In contrast, including the smaller particle sizes in the CBAM process is desirable, as it is shown to improve the amount of powder that adheres to the printed substrate sheets. Consequently, the original powder recycler not only discarded and thus wasted the smaller particles, but also diminished the performance of the CBAM process.

Applicant found use of a different type of recycler overcame this problem in part, but led to subsequent problem in need of solution. Applicants discovered that substituting the original powder recycler with a helical cyclone overcame the problem of discarding smaller particles. However, the combination of the helical cyclone with the original dump valve caused backflow into the cyclone, preventing the powder from falling from the cyclone into the trough.

SUMMARY OF THE INVENTION

Applicants discovered a solution to the aforementioned problems in a design that combines the helical cyclone for retaining the smaller particles with a two-valve (gate or flap) system that prevents backflow into the cyclone. This design recycles a larger range of particle sizes including smaller ones. This application describes a particular recycler apparatus (or powder system apparatus) which is a part of an overall machine for a printing process. Applicants developed the embodiments in the context of making improvements to automated Composite-Based Additive Manufacturing (CBAM). The recycler improves the cutoff point of previous recyclers to 3 microns, from 50 microns. It thus recycles almost all of the powder and discards almost none of it. The solution also uses a subsystem with two valves/gates/flaps that alternately open and close to release powder into a trough.

BRIEF DESCRIPTION OF THE DRAWINGS

FIG. 6D shows a closed valve and an open valve during recycling.

DETAILED DESCRIPTION OF THE
INVENTION

The Embodiment and its Related Subsystems Developed by the Applicants

Figure 1:
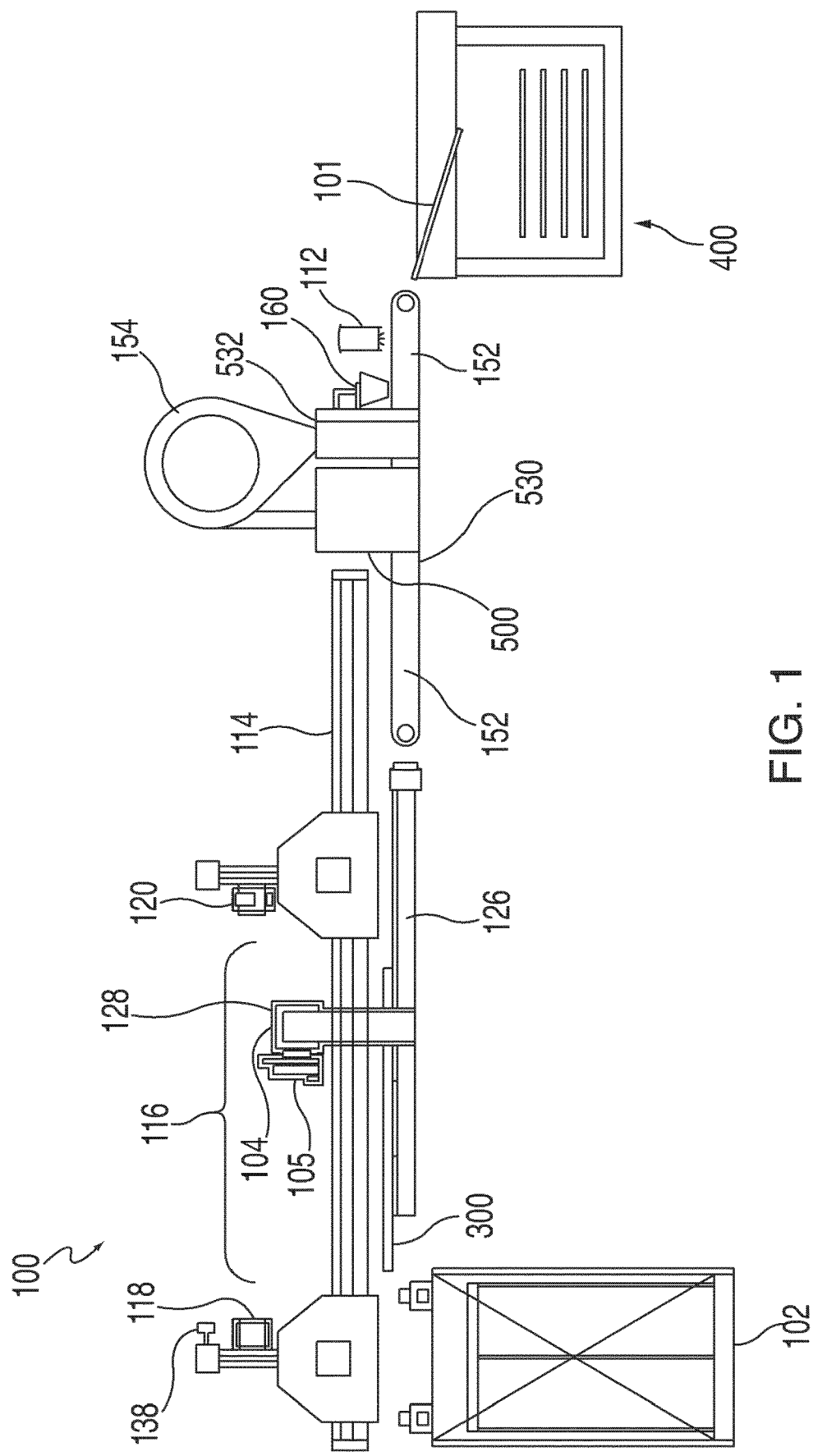
FIG. 1 is a schematic of an example embodiment of an apparatus for composite-based additive manufacturing.

The CBAM process described in the incorporated prior applications (U.S. patent application Ser. Nos. 13/582,939, 14/835,690, and 14/835,635) is automated by performing the steps through a number of components or subsystems that operate in a coordinated manner. The main components of an example embodiment of the machine 100 are shown in FIG. 1, and include a material feeder 102, a printer 104, a powder system 500 comprising a powder applicator 530 and powder remover/recycler 532, an optional fuser 112, a transfer system, and other elements that serve to connect and control the various components. While example components are shown in FIG. 1, various alternative and optional components are also suitable for use with the machine 100.

The material feeder 102 holds a stack of substrate sheets 101, such as carbon fiber sheets, and moves them into proper position so that a single sheet 101 at a time can be transferred to the printer platen 300 and printer 104. Sheets 101 are transferred to, and positioned for, the printer 104 by means of the transfer system. The printer 104 then deposits fluid at precise locations onto a substrate sheet 101 as in the incorporated prior applications (U.S. patent application Ser. Nos. 13/582,939, 14/835,690, and 14/835,635), and includes a punching mechanism for placing registration holes in the sheet 101 at desired locations. The registration holes are placed in precise, pre-defined positions relative to the position of the layer images printed onto the sheets. This can be accomplished by mounting the punches on the same frame that the printing mechanism is placed, or using other alignment mechanisms that are well known in the art.

The powder applicator 530 then deposits thermoplastic powder onto the substrate sheet 101, whereupon the powder adheres to the areas of the sheet 101 that have been made wet by the printer 104, i.e., the layer images. In typical application, the powder applicator is a trough containing powder. The trough has a slitted opening on its underside and is connected to an electromechanical vibrator. The vibrator, when active, causes powder to flow downward through the slitted opening and out of the trough. The vibrator is actuated when a sensor circuit (not shown) senses the presence of sheet 101 underneath as it passes on the conveyor. When the sheet has completely passed, the vibrator deactivates and powder ceases flowing downward from the trough.

The powder remover 532 removes any powder that did not adhere to the sheet 101. In typical application, this is a vacuum system coupled to the cyclone (to be described later). A star wheel assembly (not shown) holds down edges of sheet 101 as it passes near the powder remover 532, to prevent the vacuum force from lifting the sheet from the conveyor. Those star wheels (thin disks of metal) roll at the same speed as the conveyor. The fuser 112, which is optional, heats the powder on the substrate sheet 101 in a manner sufficient to cause the powder to melt and thereby affix to the sheet 101, so that the powder remains on the sheet 101 when and if the underlying fluid from the printer 104 dries. This cycle is repeated for as many additional substrate sheets 101 as required for making a specified three-dimensional (3D) part or object, with each sheet 101 normally representing a layer of the 3D part or object. The apparatus also includes a stacker subsystem 400 for stacking the sheets in register, based on the aforementioned punched holes.

Also shown in the embodiment of the machine depicted in FIG. 1 is a distance sensor 138, Coandaor felted-material gripper 118, XYZ positioner 116, X positioner 126, Y positioner 128, print heads 105, needle or felted-material gripper 120, rails 114, conveyor 152, cyclone 154, and air knife 160. These components are described in detail in international application no. PCT/US17/1772 and U.S. application Ser. No. 15/611,320.

Figure 2:
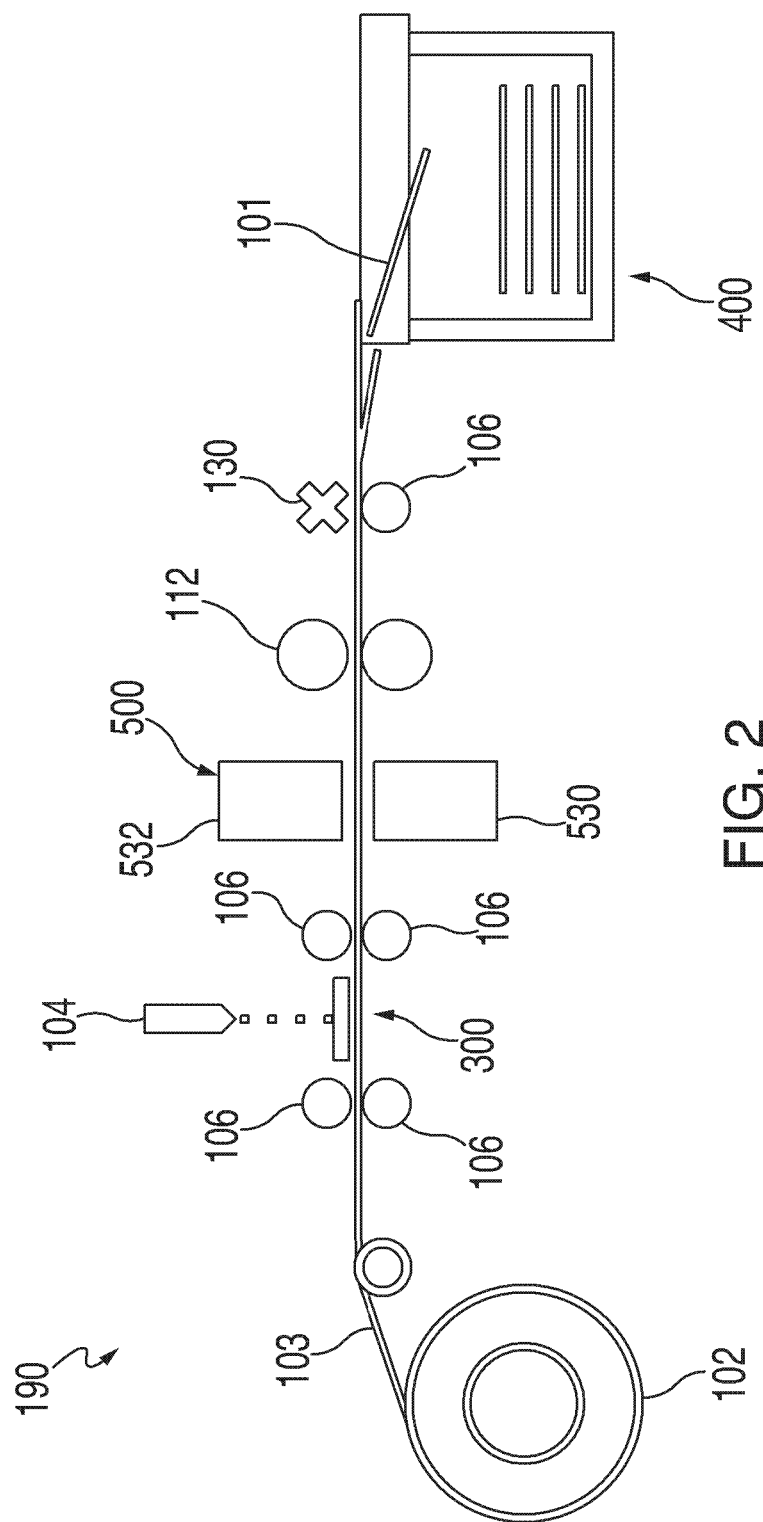
FIG. 2 depicts a roll-based continuous feed apparatus for composite-based additive manufacturing.
Figure 3:
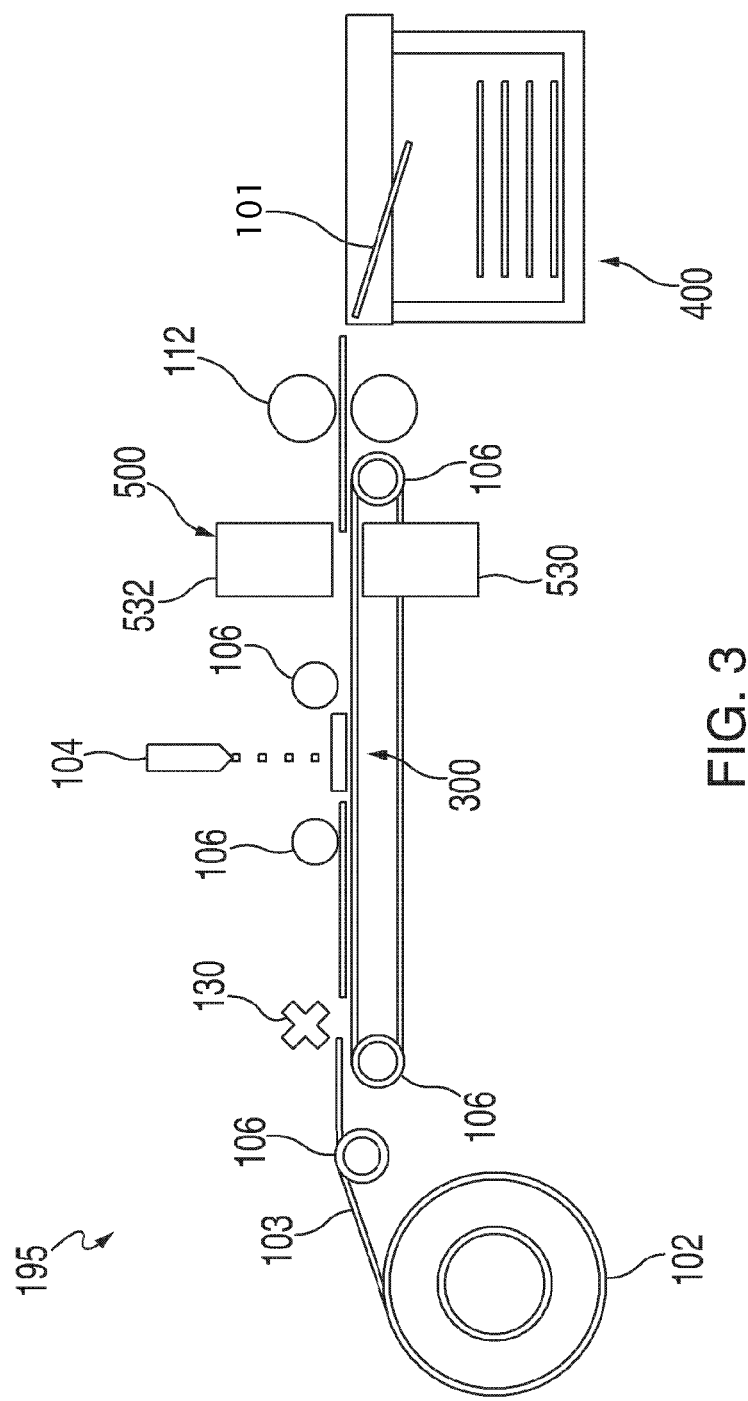
FIG. 3 depicts a roll-based roll to sheet apparatus for composite-based additive manufacturing.

Instead of using substrate sheets, a roll of substrate material may be used in the CBAM process and automated machine. FIG. 2 depicts a continuous feed roll implementation 190, and FIG. 3 depicts a roll to sheet implementation 195. In these embodiments, a roll of substrate material 102 is mounted and situated ahead of the printer 104. A tensioning system 103 together with feed rollers 106 are used to hold and advance the web defined by the length of the roll material fed through the system. The web 102 can extend through all of the components of the system—printer 104, powder system 500 comprising powder applicator 530 and powder remover/recycler 532, and, if present, fuser 112—and then be cut by a cutter 130 into single sheets 101 prior to stacking by the stacker subsystem 400. This is depicted in FIG. 2. Alternatively, as depicted in FIG. 3 the web 102 may be cut by the cutter 130 into single sheets 101 at any prior point in the process. For example, the web 102 may be converted to a single sheet 101 prior to advancing the resulting sheet 101 onto the printer platen 300. The web 102 may be converted to a single sheet after the leading edge is situated on the platen 300. The web 102 may be converted to a single sheet after the printing operation is completed and before the resulting sheet is fed into the powder applicator 530, and so on.

Recycler Subsystem

The recycler 532 of the present invention has a 3-micron cutoff (particles smaller than 3 microns will be discarded rather than recycled by the recycler). The 3-micron cutoff of the recycler 532 disclosed in the present invention is lower than previous recyclers which only had a 50-micron cutoff. So, for the 3 micron cutoff machine, most particles get recycled whereas in the 50 micron cutoff machine, a substantial proportion of particles did not get recycled.

In a prior system, a dump valve cylinder (disclosed in International Application No. PCT/US17/17672 and U.S. application Ser. No. 15/611,320—see FIGS. 18-23 and corresponding explanation in the specification) was the final subsystem that placed powder into a trough. The dump valve cylinder was in a casing that has a top hole and bottom hole. As the cylinder rotated, the powder that was condensed in the old cyclone dropped through the top hole in the casing and into the cylinder. As the cylinder rotated 180 degrees, the cylinder closed the vacuum inside the cyclone. The powder then fell out of the cylinder through the bottom hole in the casing and into a trough. The problem with this dump valve design is that it only works with certain powders that are heavier (bigger particles). In order for the cylindrical valve to work, it should allow some air backflow into the cyclone. That design works when the particles are heavy enough (large enough) that the air backflow does not prevent them from continuing to drop down (against the backflow) and passing through the valve into the trough. This feature develops into a problem when smaller/lighter particles succeed in traveling toward the trough because the air backflow prevents them from passing through the valve and into the trough.

Figure 4B:
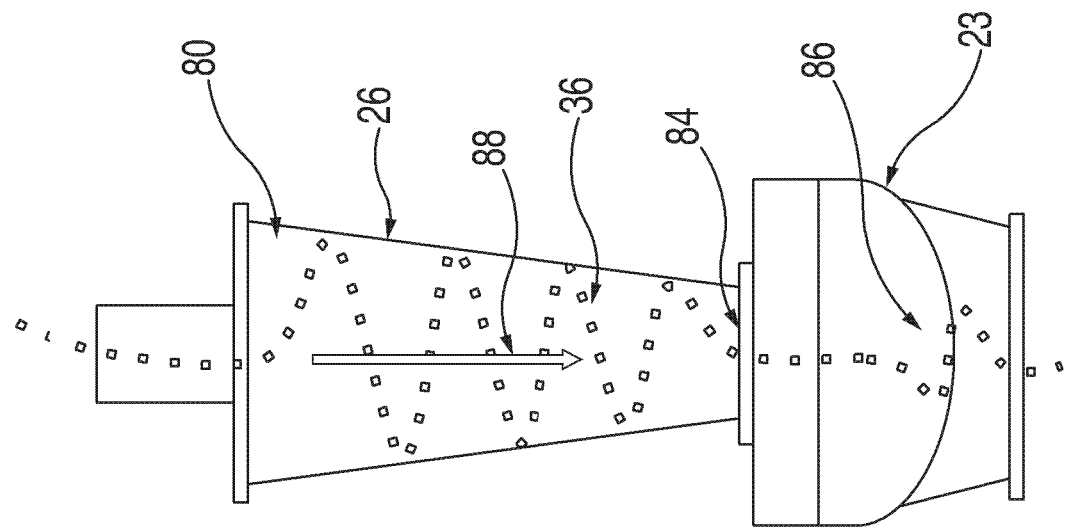
FIG. 4B is a schematic representation of a collector system.
Figure 4A:
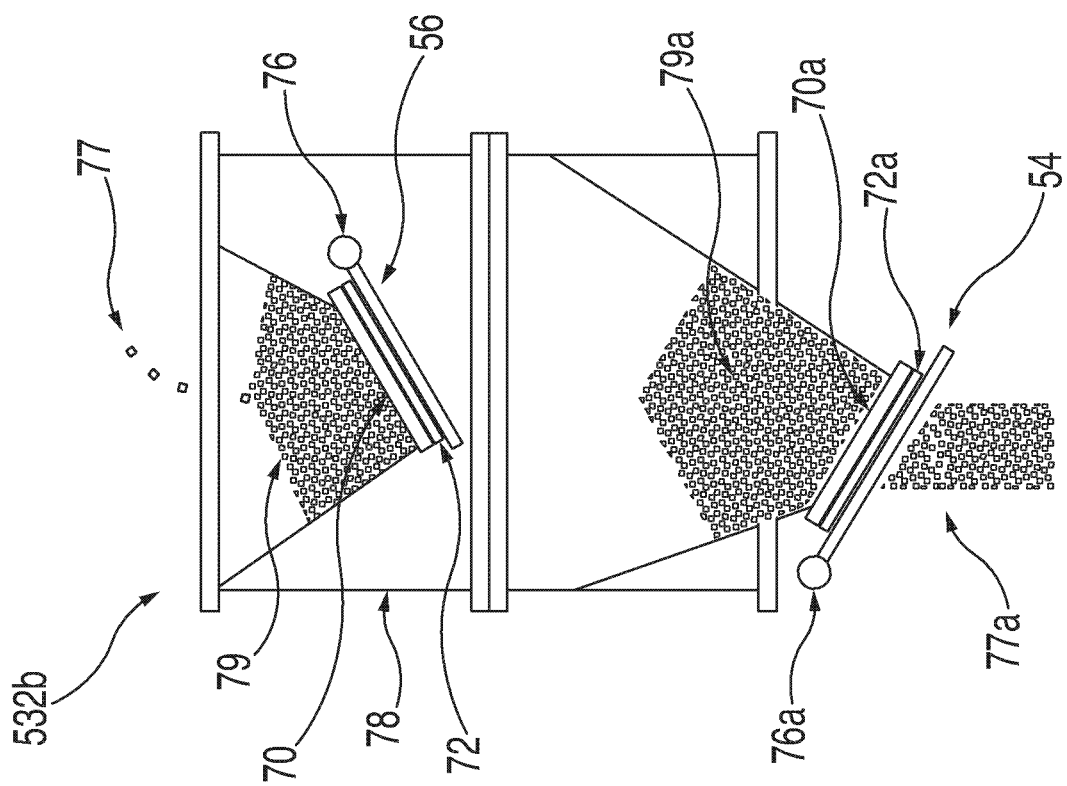
FIG. 4A is a schematic representation of a two-valve recycler.

FIG. 4A shows a schematic of part of a recycler valve system 532b with two valves which solves the problem. The preferred embodiment uses a depression with a flange 70 on a cyclone or other container 79. The invention has rubber gaskets 72 and a valve 56 connected to an axis 76, at a slant to the vertical. There are two valves 56, 54 in a chamber 78. The other cyclone container/valve has the opposite horizontal orientation (see 70a, 72a, 54, and 76a). One axis 76 allows valve 56 to open to one side, and the other axis 76a allows valve 54 to open to the other side. The design is called an aerodyne-style valve, which has preexisting uses in ash collection in industrial settings.

Its use is heretofore unknown in print processes or additive manufacturing. If both valves (56, 54) are closed, the volume in the upper part of cyclone 79 (the volume opposite parts 70, 72, 56, and 76, and not shown in FIG. 4A) is insulated from the outside. As the powder 77 (which was vacuumed at nozzle 532a from recycler portion), flows into the top portion of the cyclone 79, it drops down through and is collected at the bottom portion of the cyclone 79 (as depicted in the figure). Then valve 56 opens and the collected powder propagates down to the lower valve volume 79a. Then valve 56 closes. Then valve 54 opens, and then powder 77a goes down onto a powder applicator trough 530 and then (if sensor-actuated vibration is occurring) onto the substrate sheet. This arrangement prevents airflow going up into the cyclone. Injecting air from the bottom would have stopped or degraded the operation of helical airflow that is intended to advantageously flow tangent along the inner cyclone surface to cause downward movement of powder.

FIG. 4B is a schematic of the collector system which is above the two-valve system shown in FIG. 4A. A collector 23 is necessary because a cyclone 26, with air blown in (at item 80) creates a helical swirl 36 in an "I" direction 88, and it is necessary to not disrupt the flow of the powder in the "I" direction 88 as it exits the system. Thus, there must always be a collection area beyond point 84 of the swirl 36 so the powder 77 can accumulate at 86.

Figure 5:
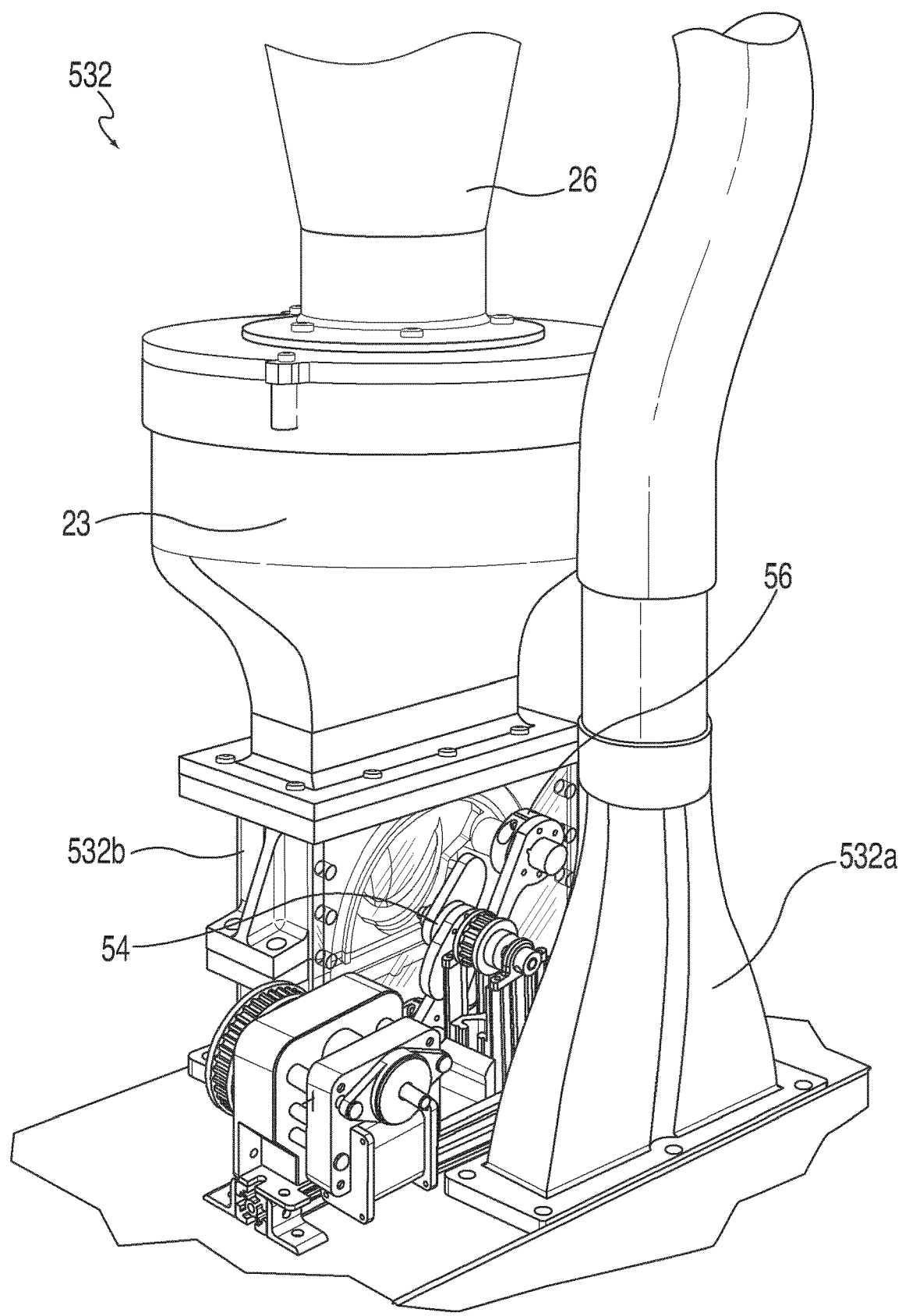
FIG. 5 shows the bottom rear of an example recycler.

FIG. 5 illustrates an embodiment of the bottom rear of an example recycler system 532, including powder vacuum nozzle 532a and valve system 532b. Valve system 532b puts the recycled powder back into a powder applicator trough 530 (see FIG. 17). Item 26, the recycler cyclone, can be purchased from Oneida®, trade name Dust Deputy.

However, the cyclone alone does not work because of the manner the particles get recycled. Therefore, an entire design is needed (including the cyclone) so that particles get recycled. Item 532b (valve system) ensures that the powder falls into the trough as already described in the context of FIGS. 4A and 4B. After a significant amount of powder is accumulated, the powder (not the air) is released without backflow. Valve 56 will close, and another valve 54 will open, to allow only powder to flow down to the trough and not allow air to flow up to the cyclone.

Figure 6A:
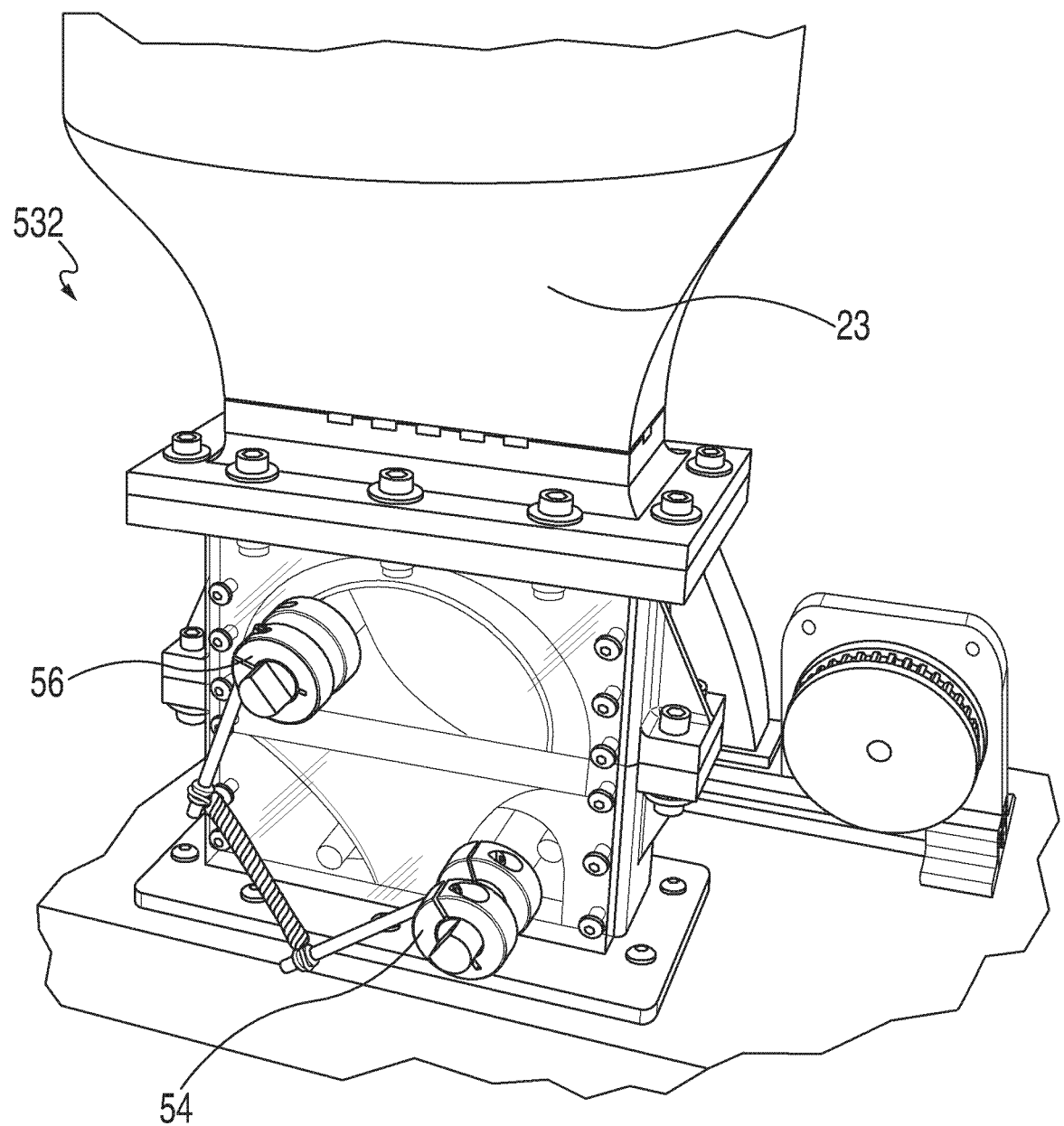
FIG. 6A shows the bottom front of the example recycler.
Figure 6B:
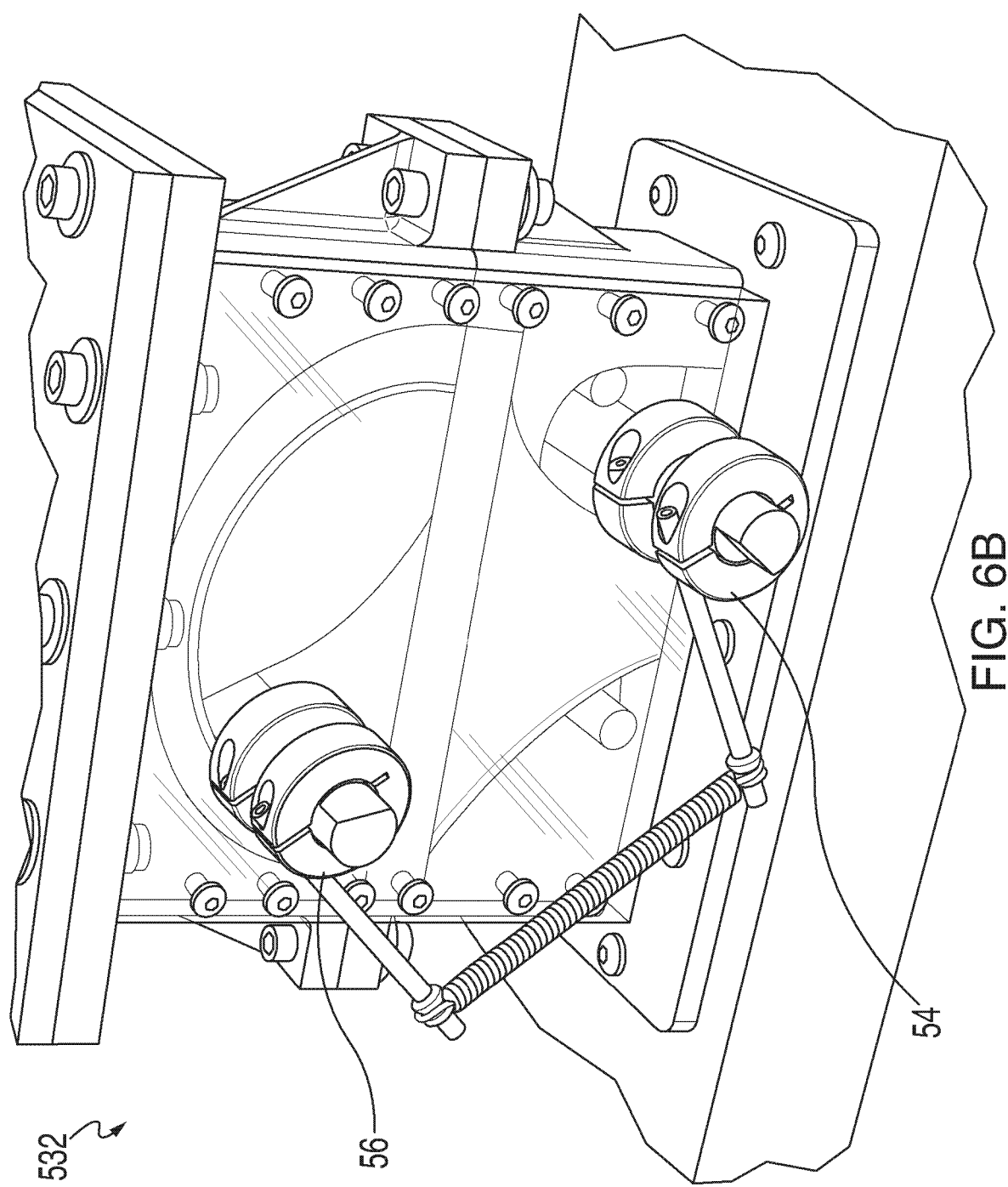
FIG. 6B shows an open valve and a closed valve during recycling.
Figure 6C:
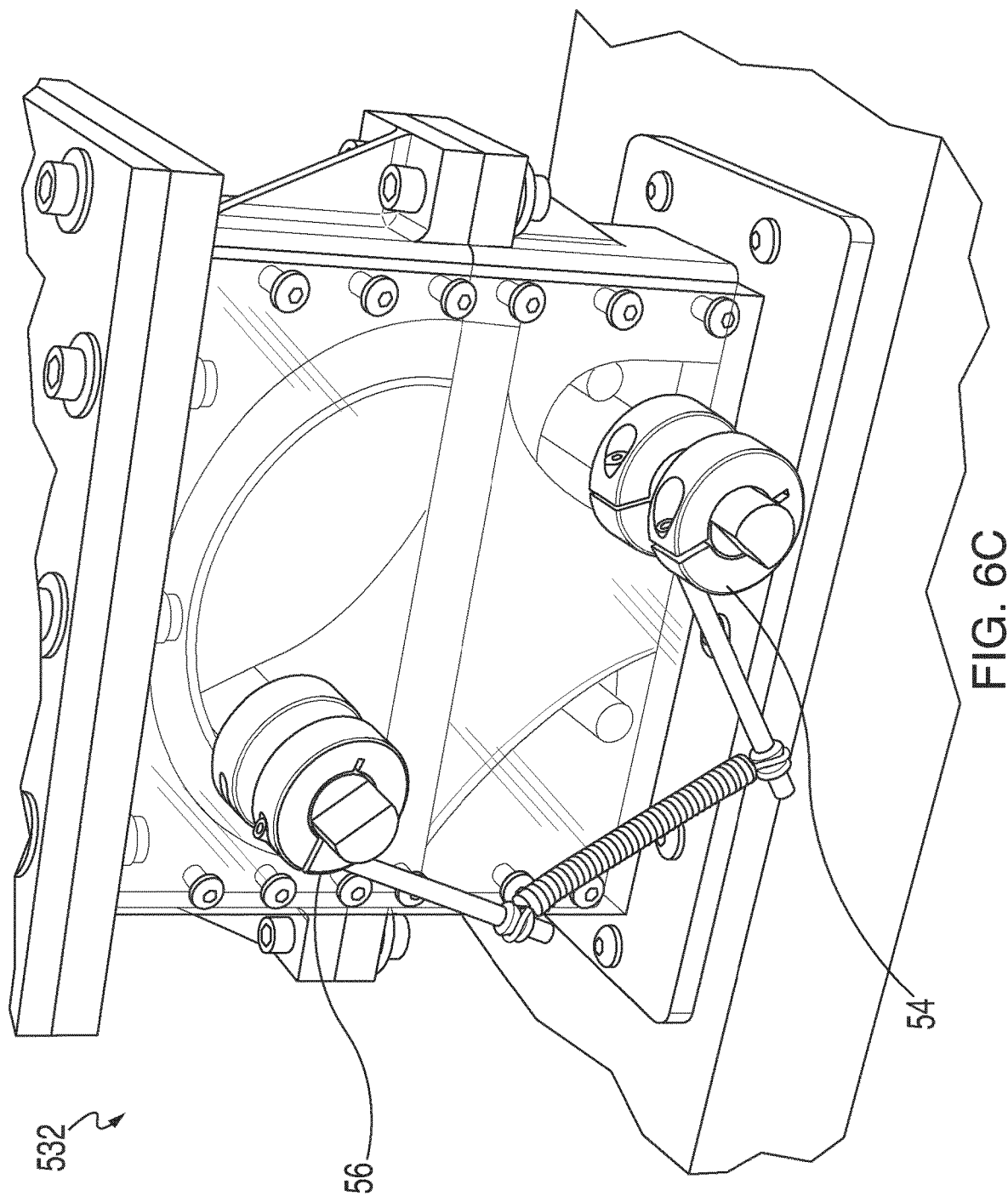
FIG. 6C shows a closed valve and a closed valve during recycling.

FIG. 6A illustrates the bottom front of the example recycler system 532. The recycling process works as follows. Valve 54 opens, and valve 56 closes, and vice versa. So long as either valve is closed (which is always the case), the powder accumulates all the time in the powder collector 23. Most of the time valve 56 is closed and powder accumulates into a first container situated immediately above valve 56 (see, e.g., container 79 in FIG. 4A). Then valve 54 is closed also. After, valve 56 opens and powder flows from the first container into the chamber between valves 56, 54 (see, e.g., chamber 78 in FIG. 4A) (there is no air back flow because it's blocked by valve 54), then valve 56 closes. Then valve 54 opens and allows powder to flow through (there is no air back flow because it's blocked by valve 56) and into trough 530. Then valve 54 closes. Then the cycle starts again. A mechanism ensures that valves 54 and 56 alternately open and close. Valves 54 and 56 opening and closing is shown in FIGS. 6B-6D. In FIG. 6B, valve 56 is open and valve 54 is closed. In FIG. 6C, valve 56 is closed and valve 54 is closed. In FIG. 6D, valve 56 is closed and valve 54 is open. The mechanical system which performs this can be seen in FIGS. 5-17. These consist of springs, cams, motors, gears, and other components to perform the mechanical movement that is necessary.

Figure 7B:
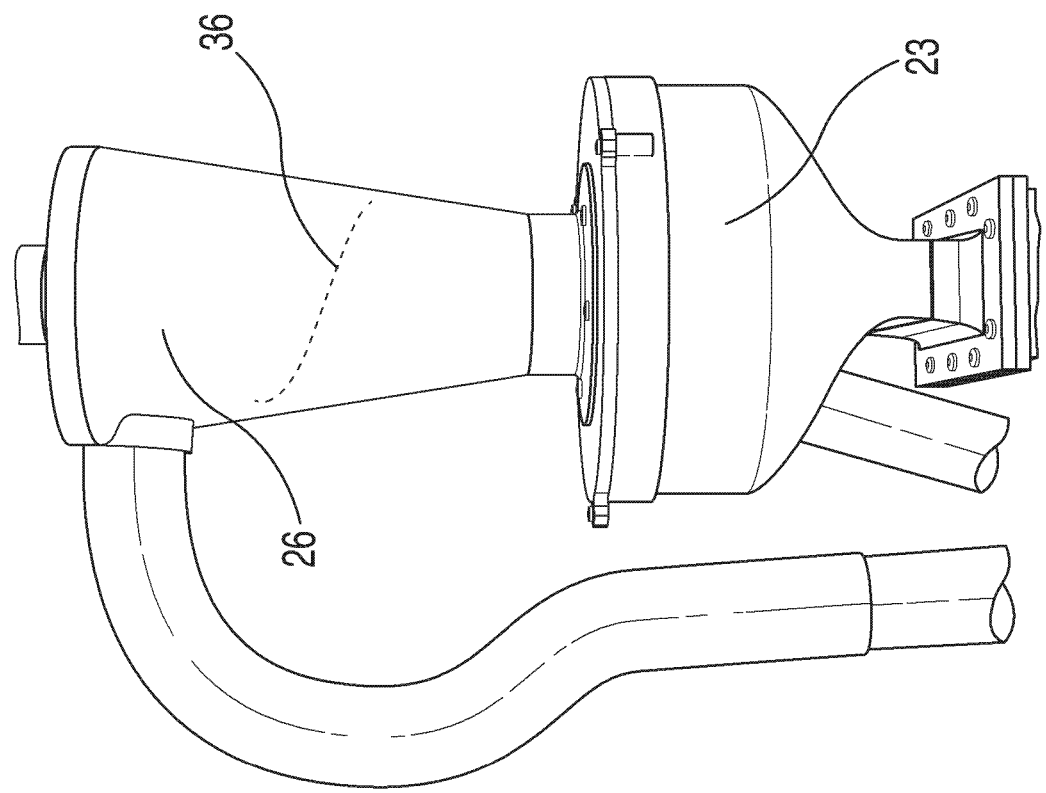
FIG. 7B shows FIG. 7A with powder swirling through it for recycling back to a trough.
Figure 7A:
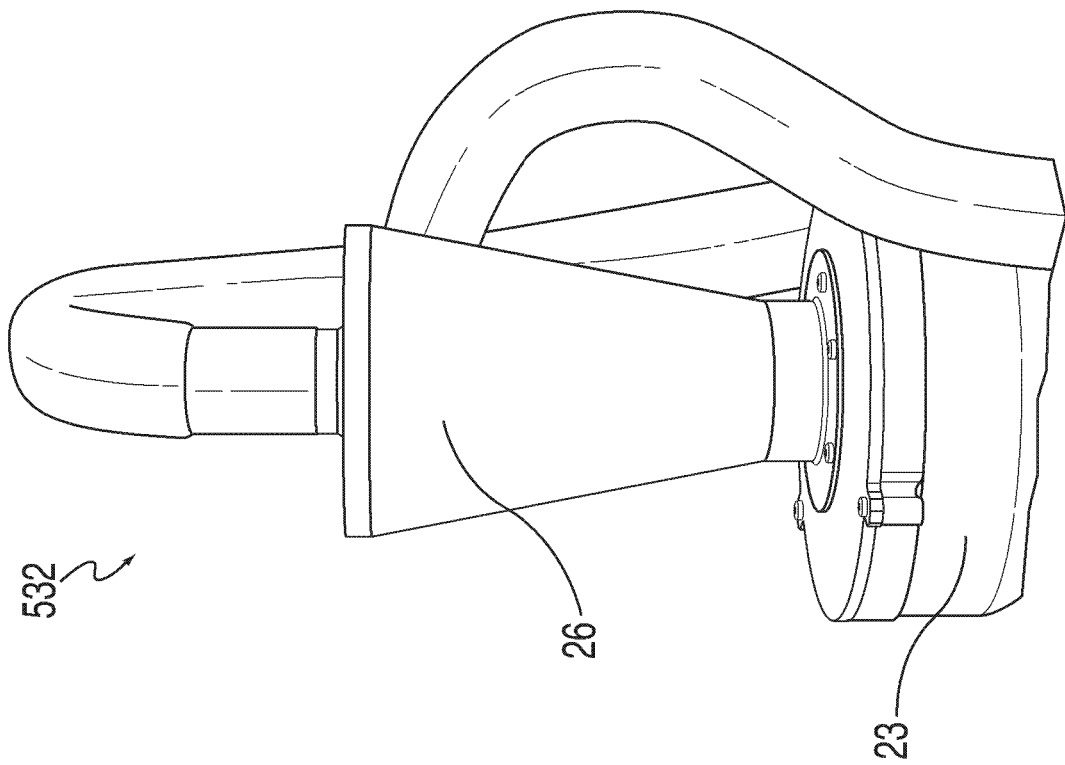
FIG. 7A shows a cyclone of the example recycler.

FIG. 7A illustrates a cyclone 26 of an embodiment of the example recycler 532. In this embodiment, the Oneida®Dust Deputy cyclone 26 replaces the cyclone 154 disclosed in PCT/US17/17672 and U.S. application Ser. No. 15/611,320. In operation of this type of cyclone, the powder swirls at the top of the device. FIG. 7B (using an ordinary vacuum motor) shows the powder 36 swirling in the cyclone 26.

Figure 8:
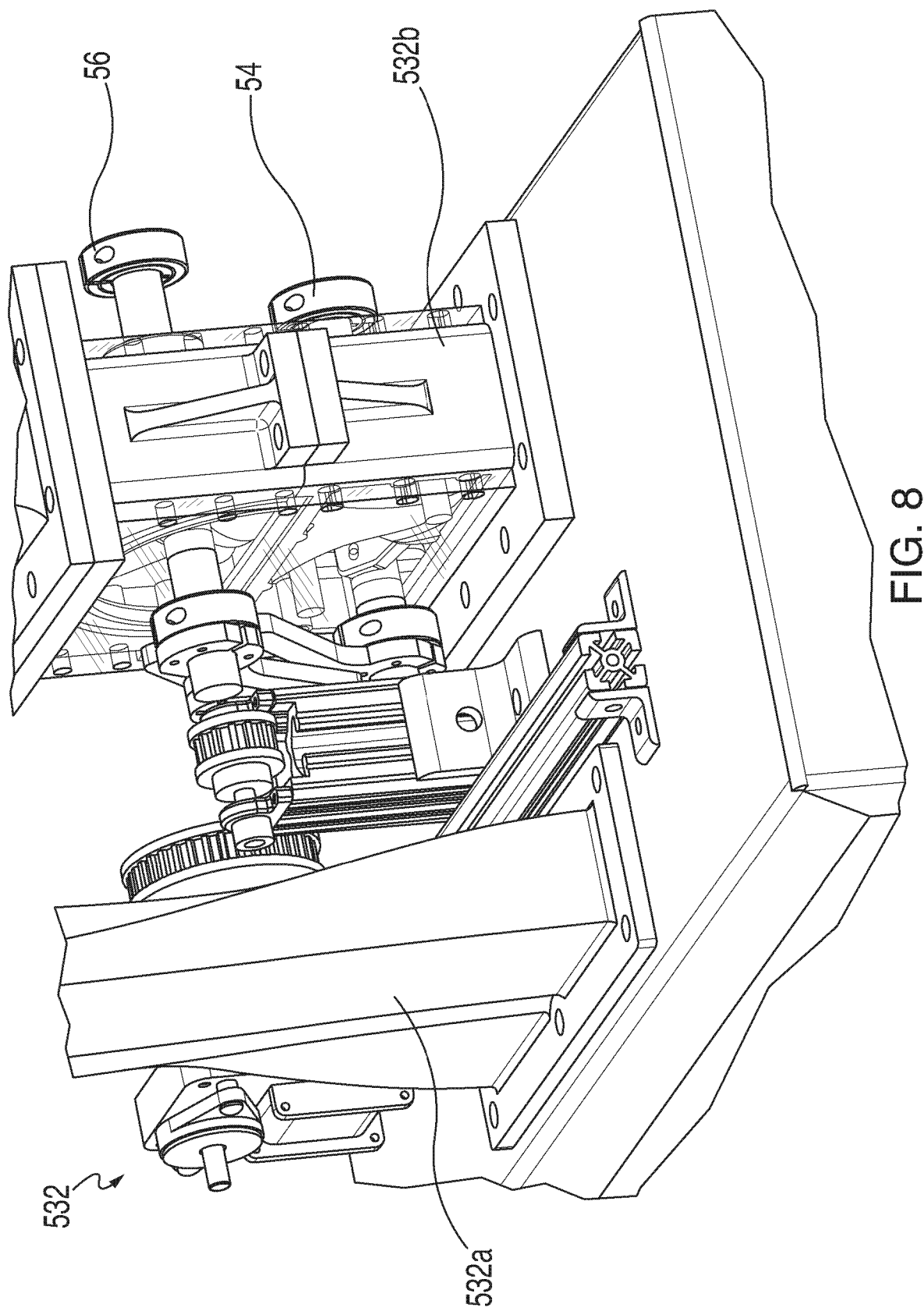
FIG. 8 is a perspective view of the bottom side of the example recycler.
Figure 9:
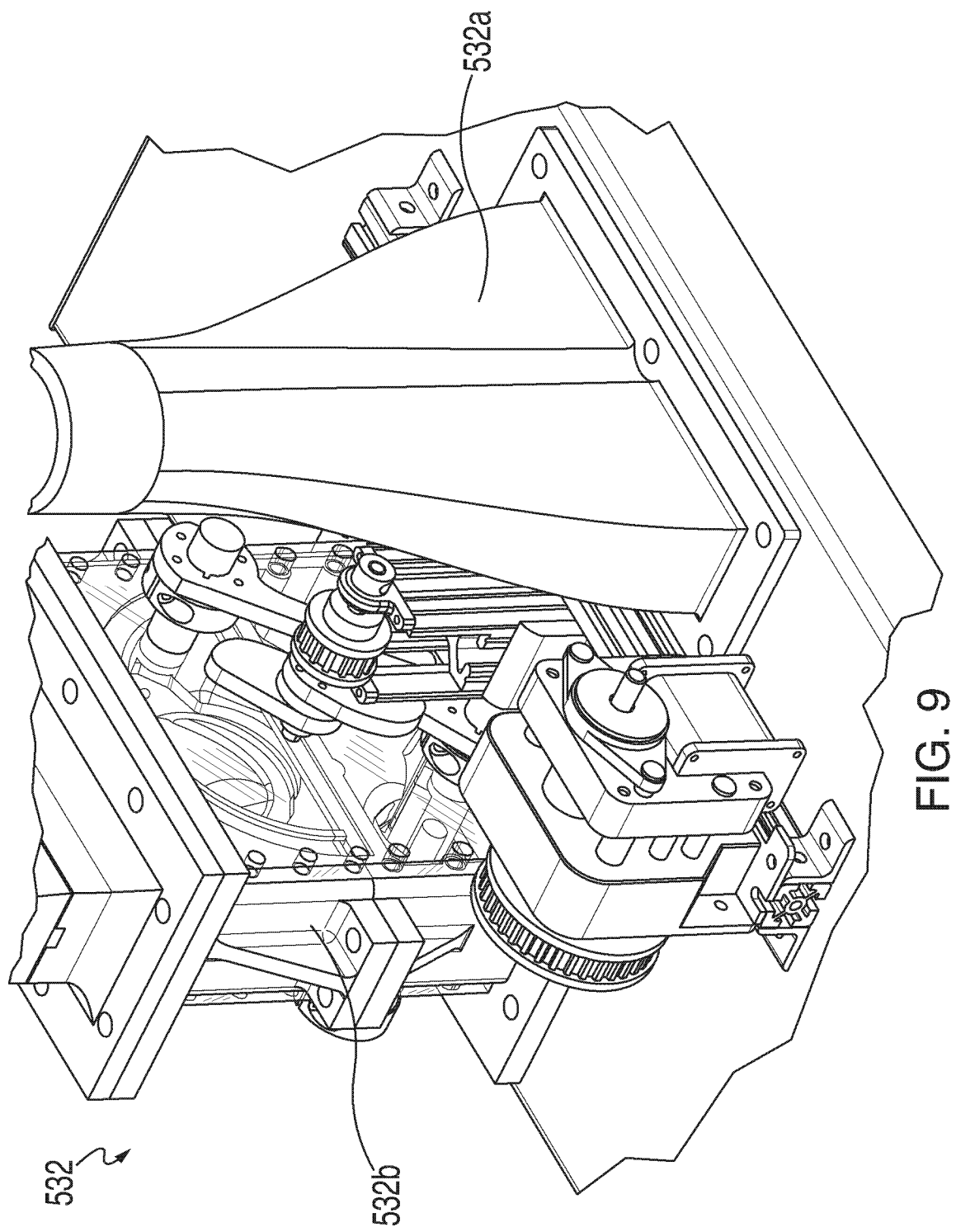
FIG. 9 is a perspective view of a bottom rear side of the example recycler.
Figure 10:
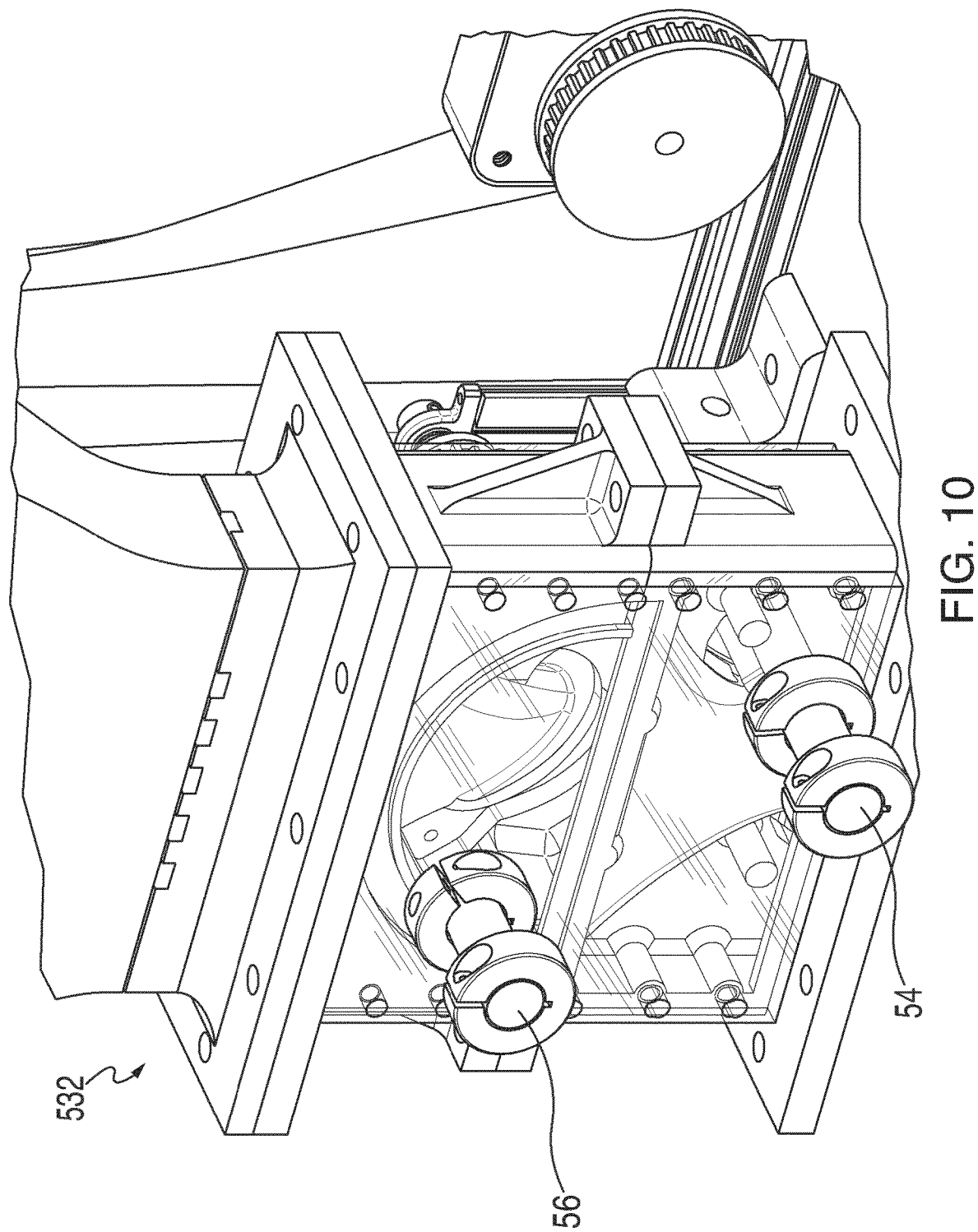
FIG. 10 is a perspective view of the bottom front side of the example recycler.
Figure 11:
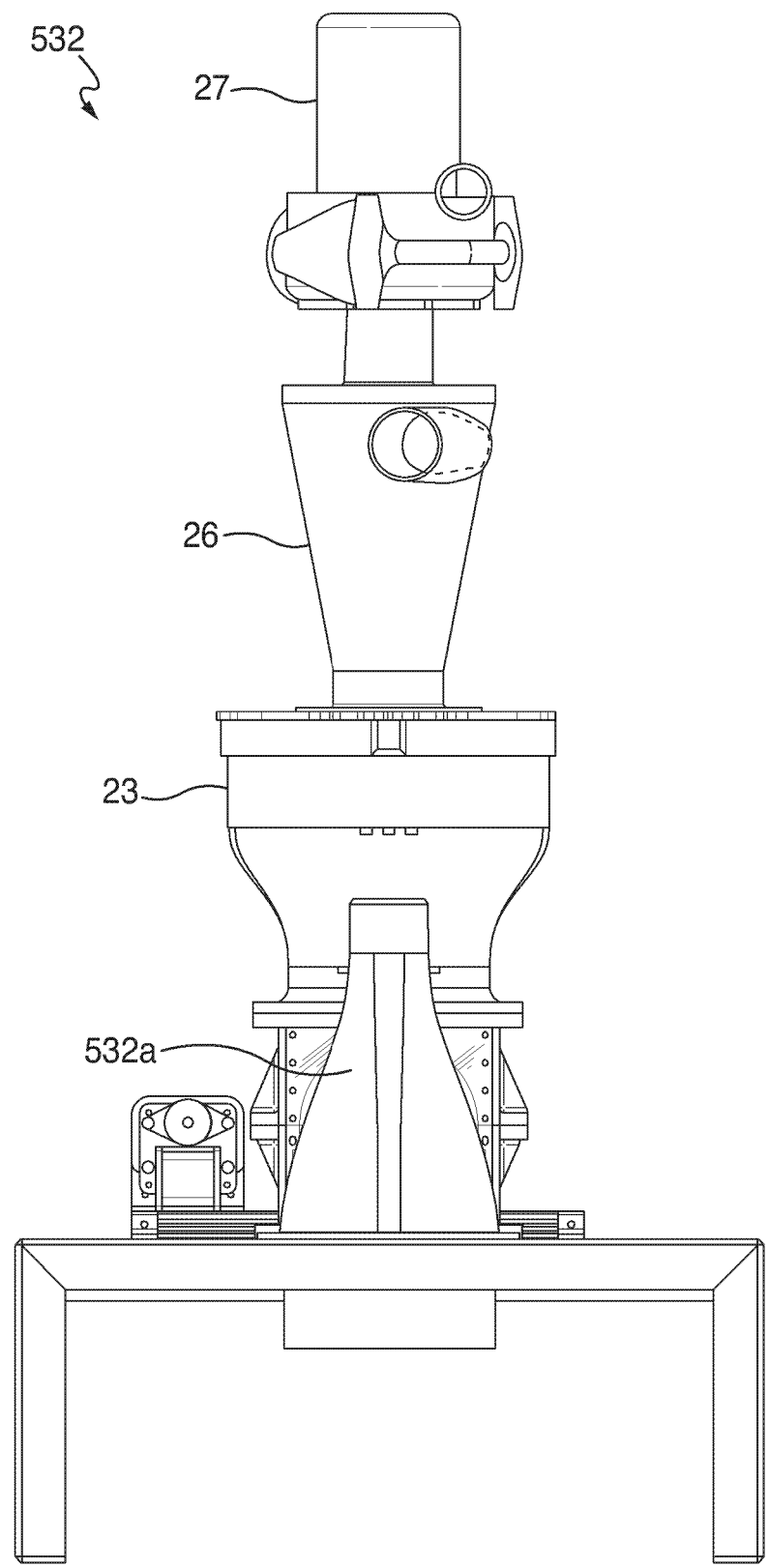
FIG. 11 is a rear view of the example recycler.
Figure 12:
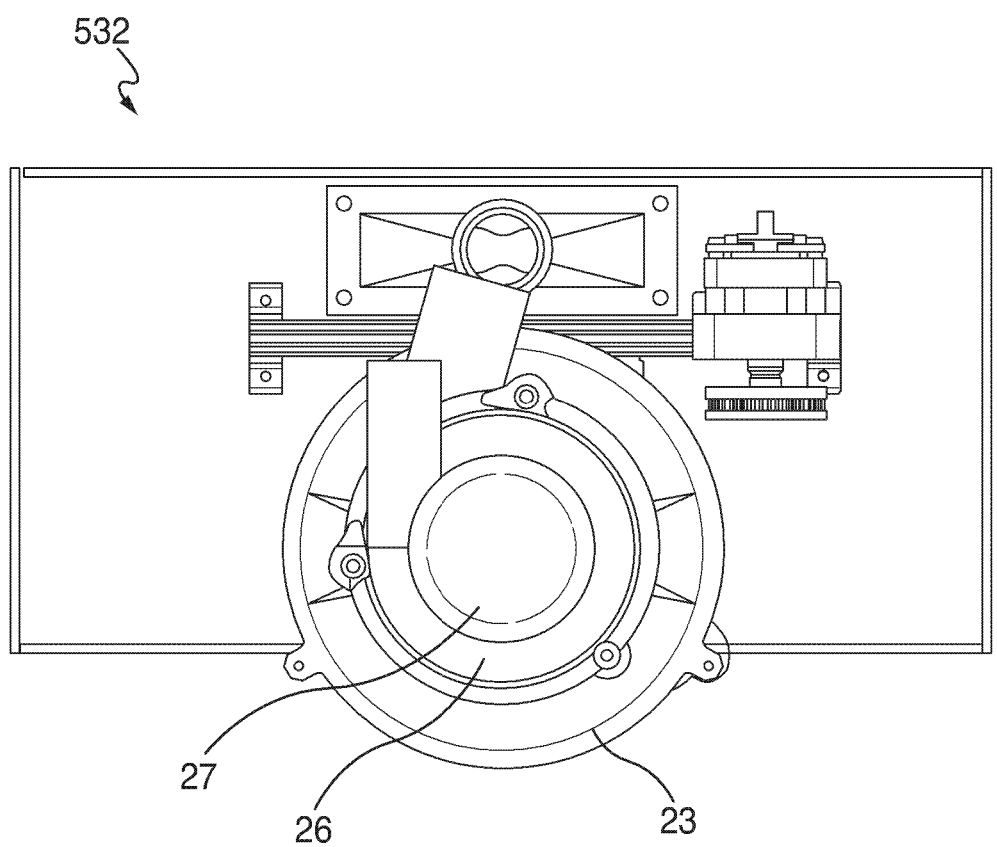
FIG. 12 is a top view of the example recycler.
Figure 13:
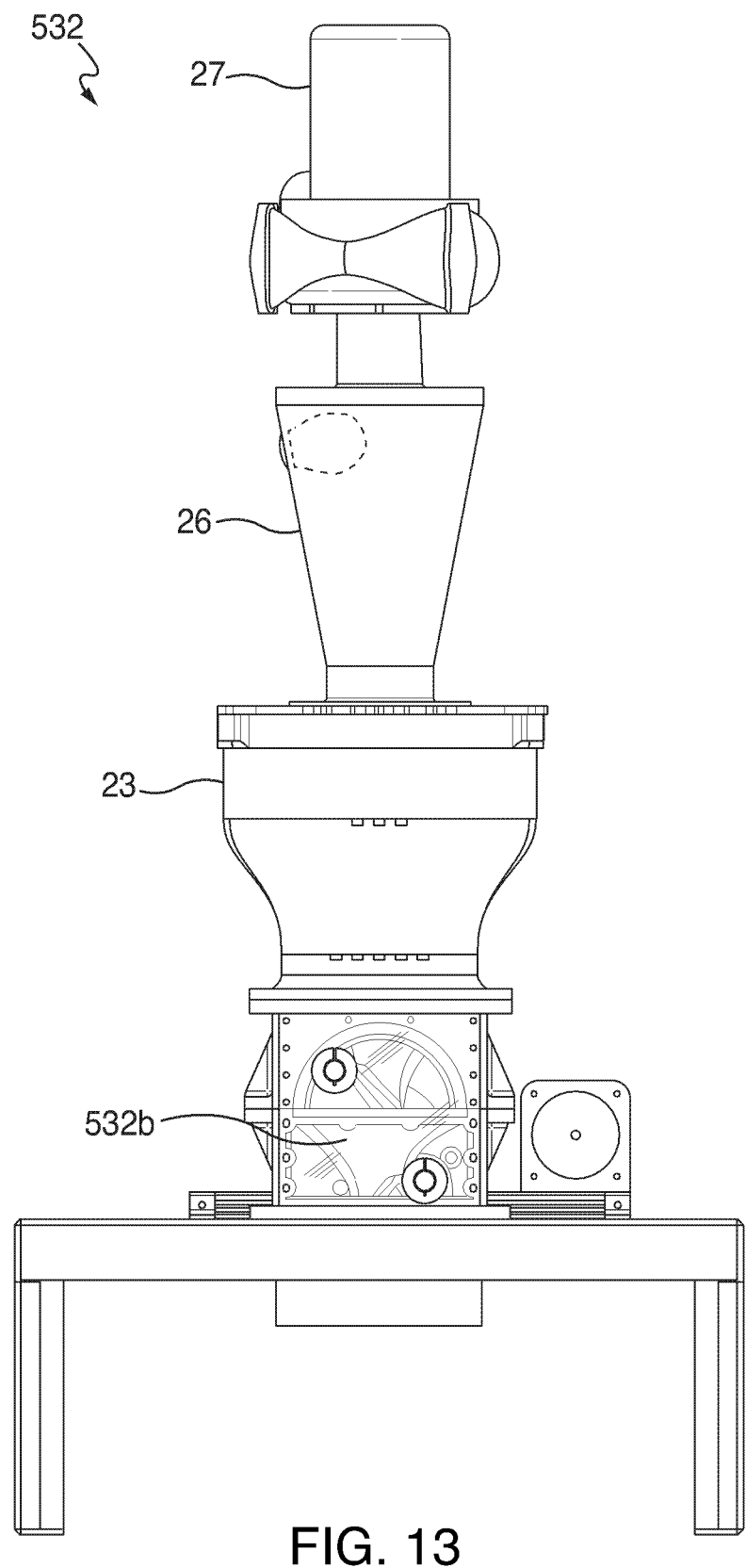
FIG. 13 is a front view of the example recycler.

FIGS. 8-16 show other views of the recycler. FIG. 8 is a perspective view of the bottom side of the embodiment of an example recycler 532. FIG. 9 is a perspective view of the bottom rear side of the example recycler 532. FIG. 10 is a perspective view of the bottom front of the example recycler 532. FIG. 11 is a rear view of the example recycler 532. Vacuum motor 27 is shown at the top in communication with the vacuum nozzle 532a. FIG. 12 is a top view of the example recycler 532. FIG. 13 is a front view of the example recycler 700.

Figure 14:
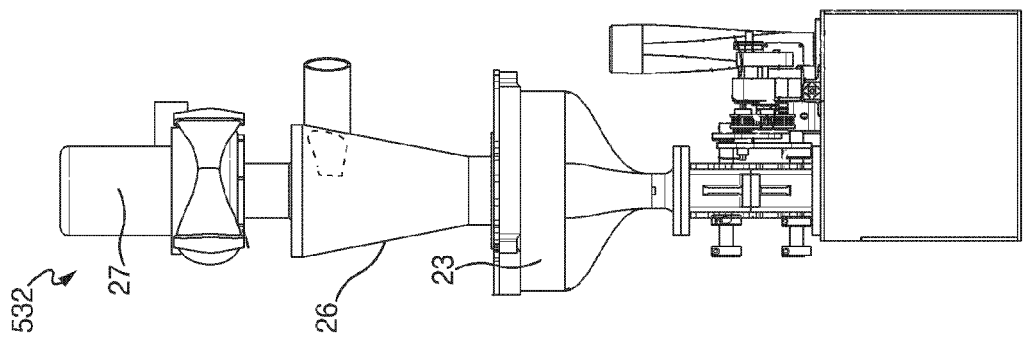
FIG. 14 is a side view of the example recycler.

FIG. 14 is a side view of the example recycler 532.

Figure 16:
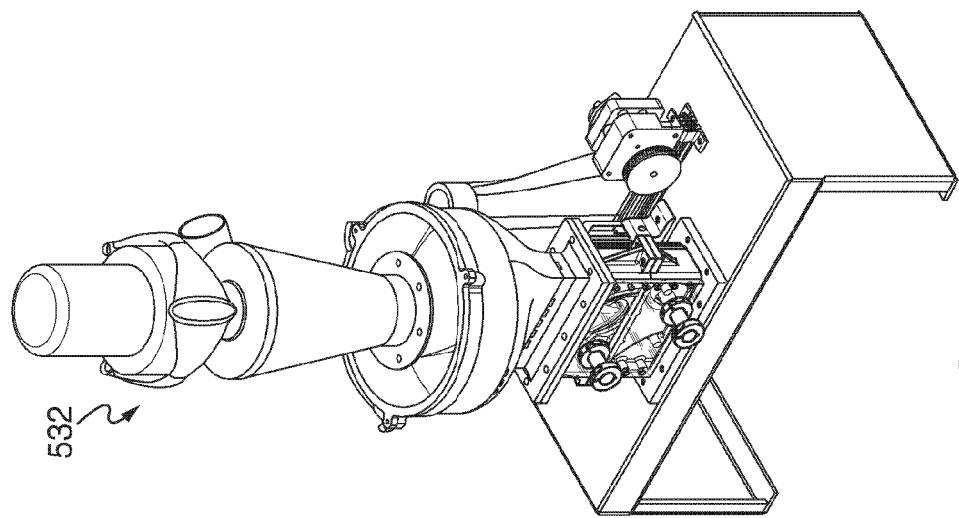
FIG. 16 is another isometric front view of the example recycler.
Figure 15:
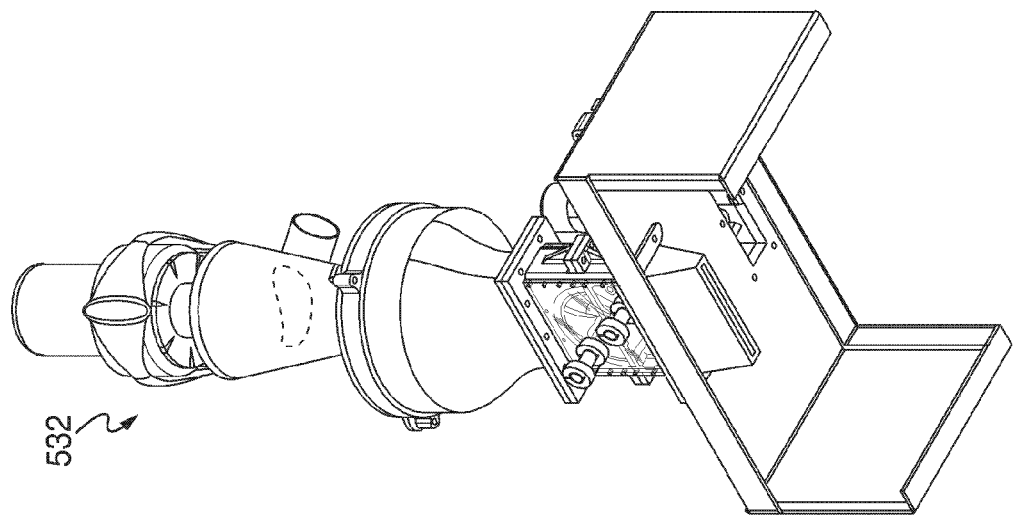
FIG. 15 is an isometric front view of the example recycler.
Figure 17:
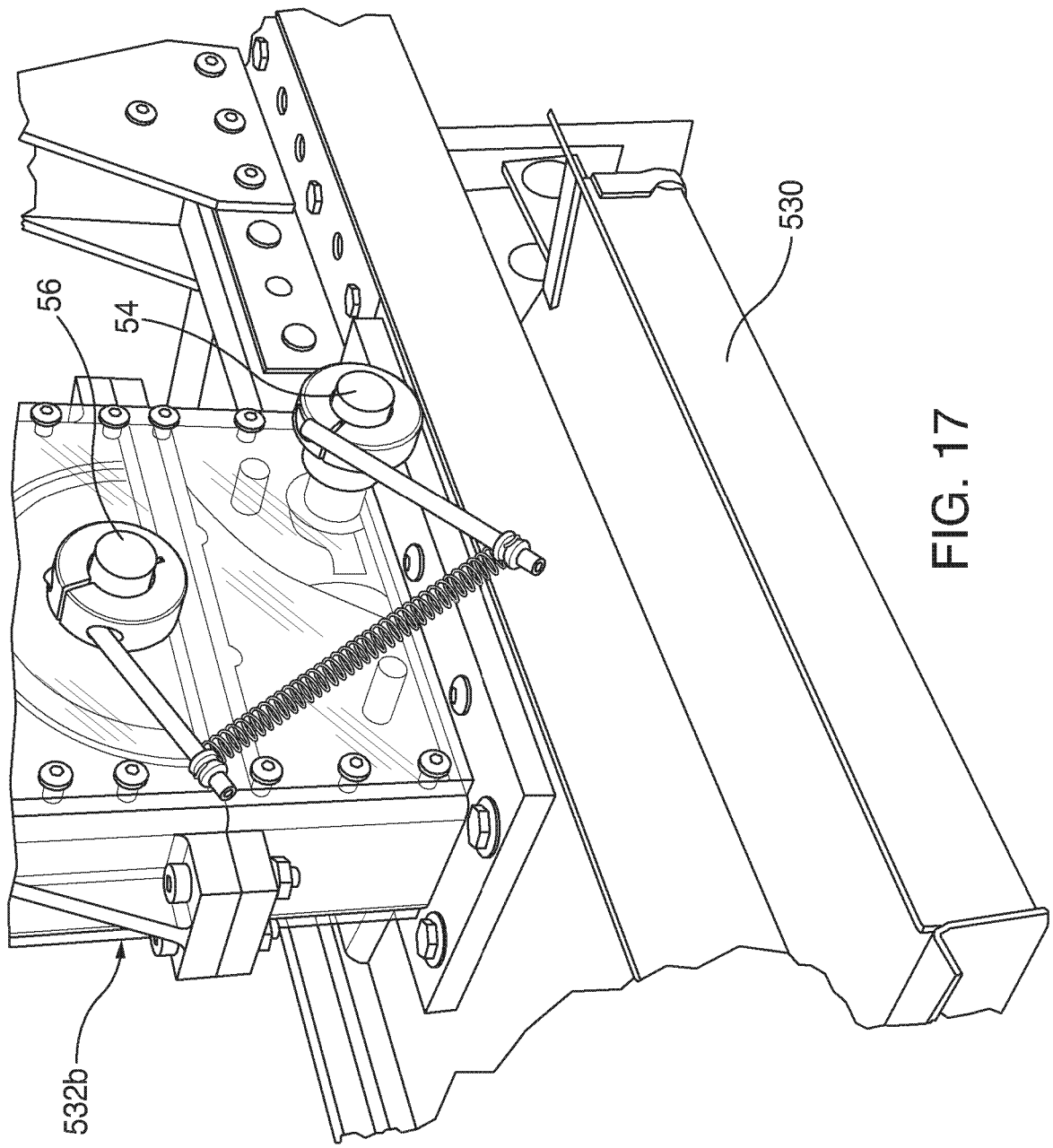
FIG. 17 shows a trough of powder situated under the recycler system that applies powder to a sheet.

FIG. 15 is an isometric front view of the recycler 532. FIG. 16 is another isometric front view of the recycler 532. FIG. 17 shows a powder applicator trough 530 of powder under the recycler 532.

Figure 18:
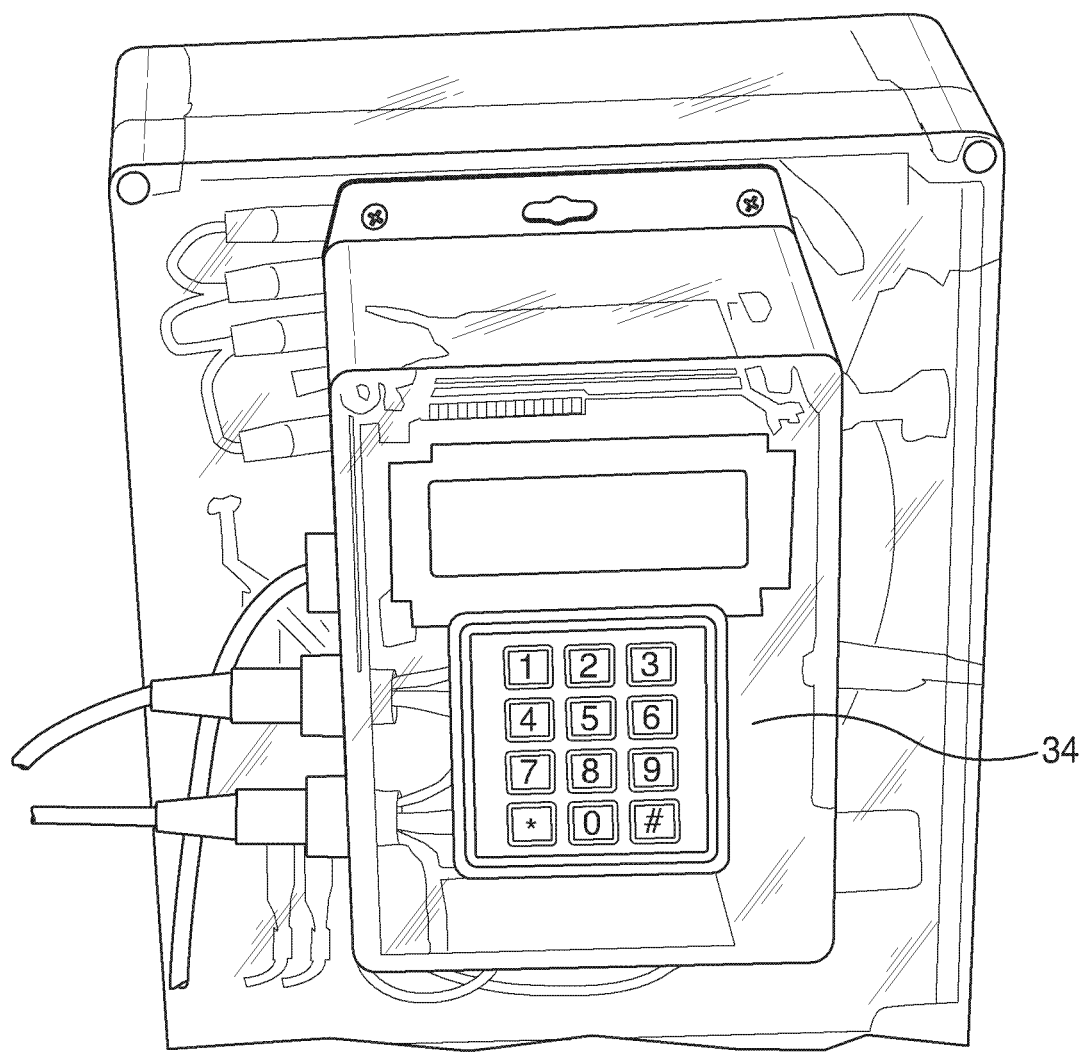
FIG. 18 shows a computer for the recycler.

FIG. 18 shows a computer 34 for the recycler 532. In operation, substrate sheets are printed upon and are then conveyed on a conveyor belt underneath the trough 530 of the powder system. The computer 34 reads through a sensor when each substrate sheet approaches the trough 530, and turns on vibration of the powder applicator trough 530 to facilitate powder flowing through the trough and getting dispensed on the substrate sheet being conveyed. A portion of the dispensed powder sticks to wetted areas of the substrate sheet (wetted from printing in a prior step). The recycler will collect the powder that did not stick to the wetted areas of the sheet by vacuuming it off, and then waits for the next sheet. When the sheet exits from the recycler, the computer 34 turns the vibration off to stop or minimize powder flowing out of the trough. This way, the maintenance of recycled powder in the trough is maximized.

Figure 19:
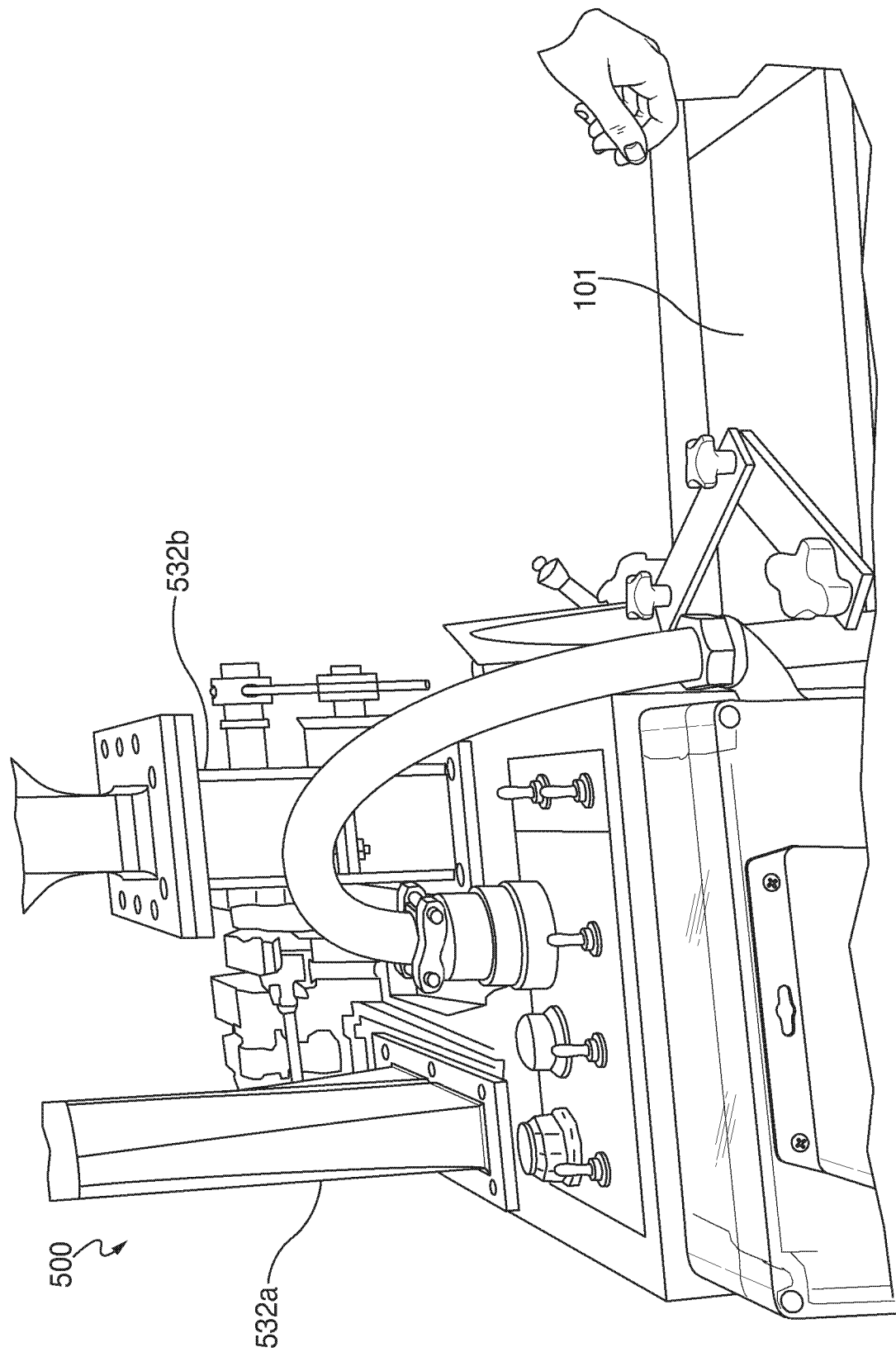
FIG. 19 illustrates a sheet as it is about to be processed through the powder system.
Figure 20:
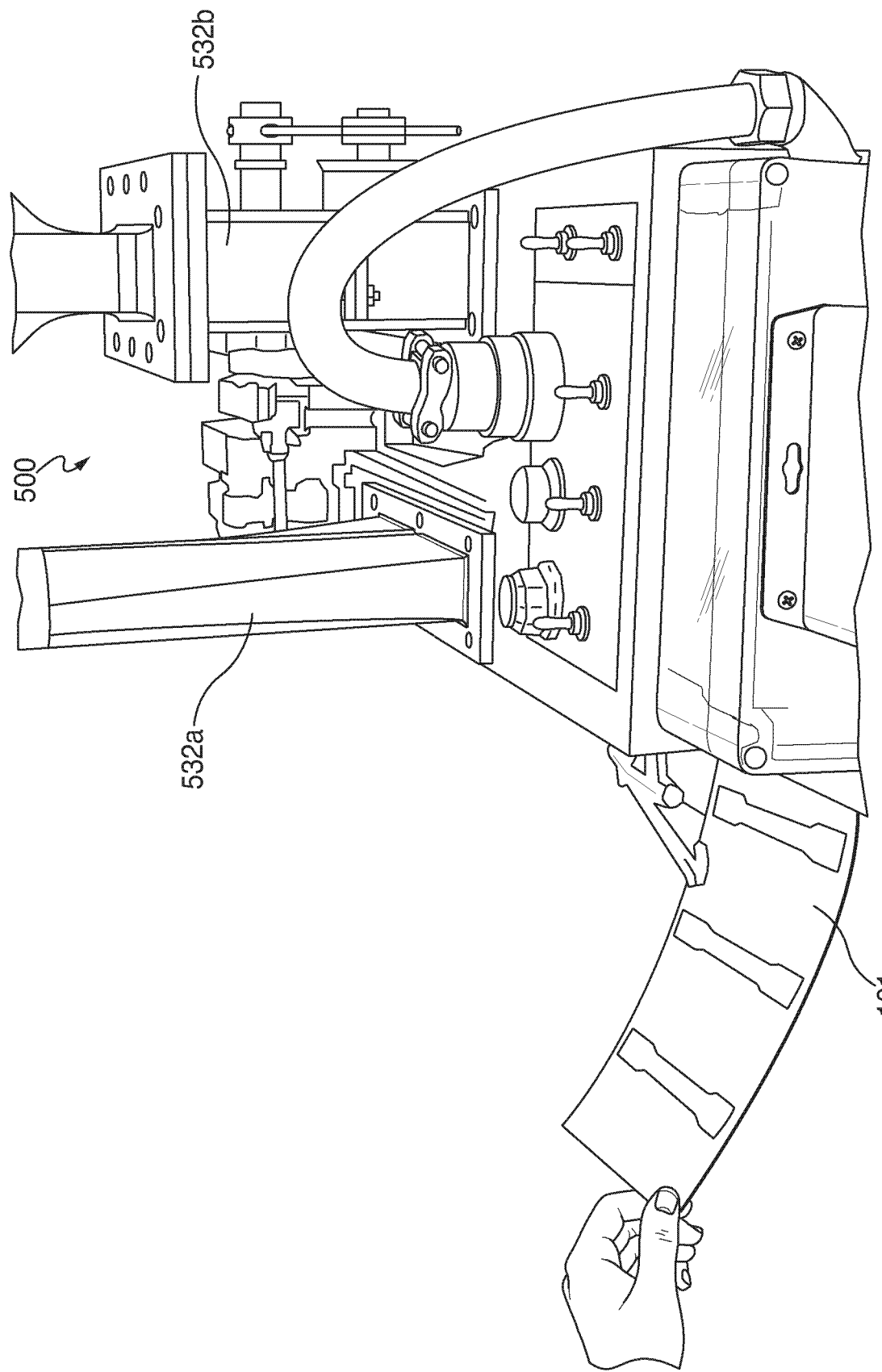
FIG. 20 shows a sheet as it exits the powder system.
Figure 21:
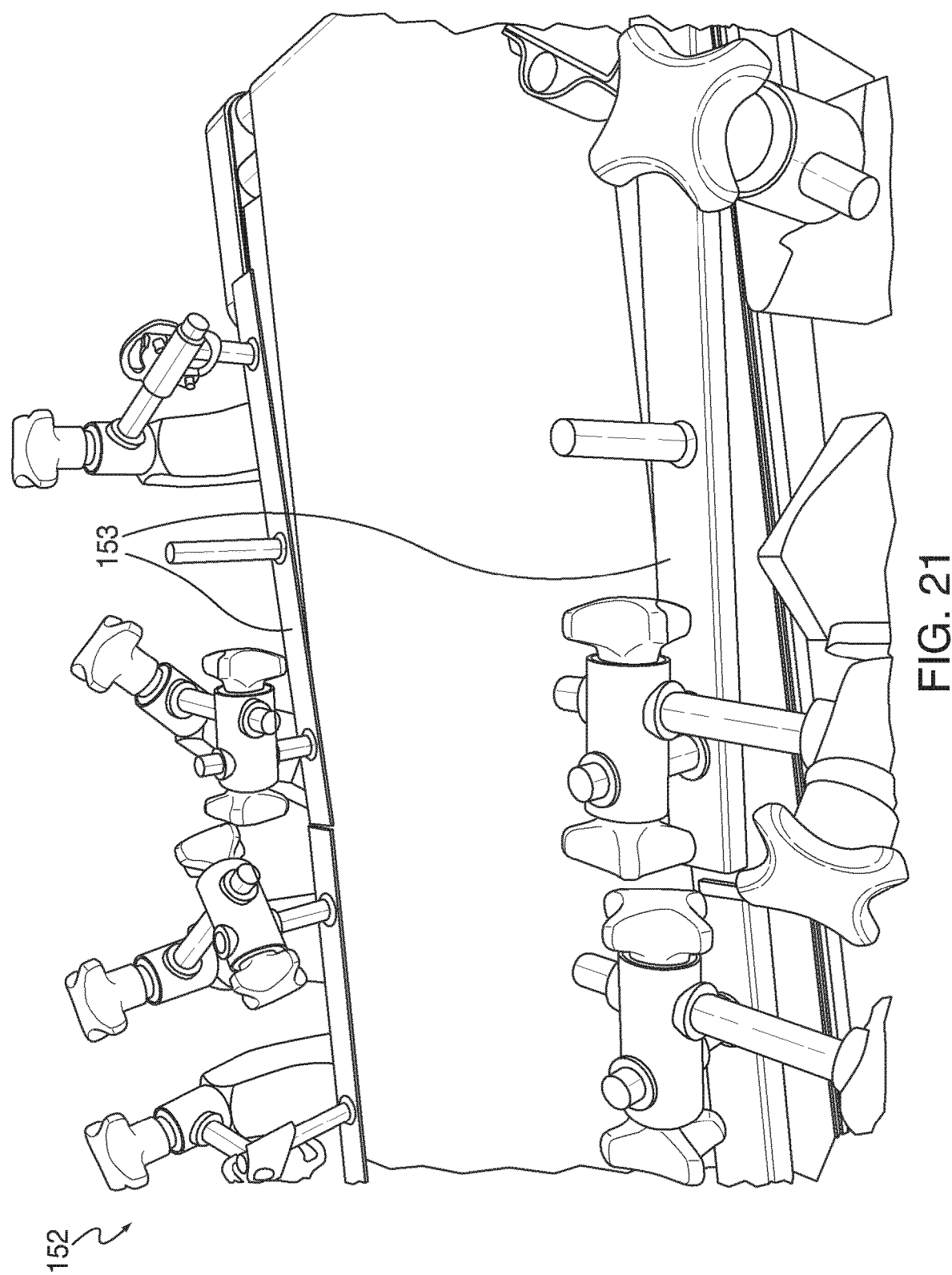
FIG. 21 is a view of a conveyor.
Figure 22:
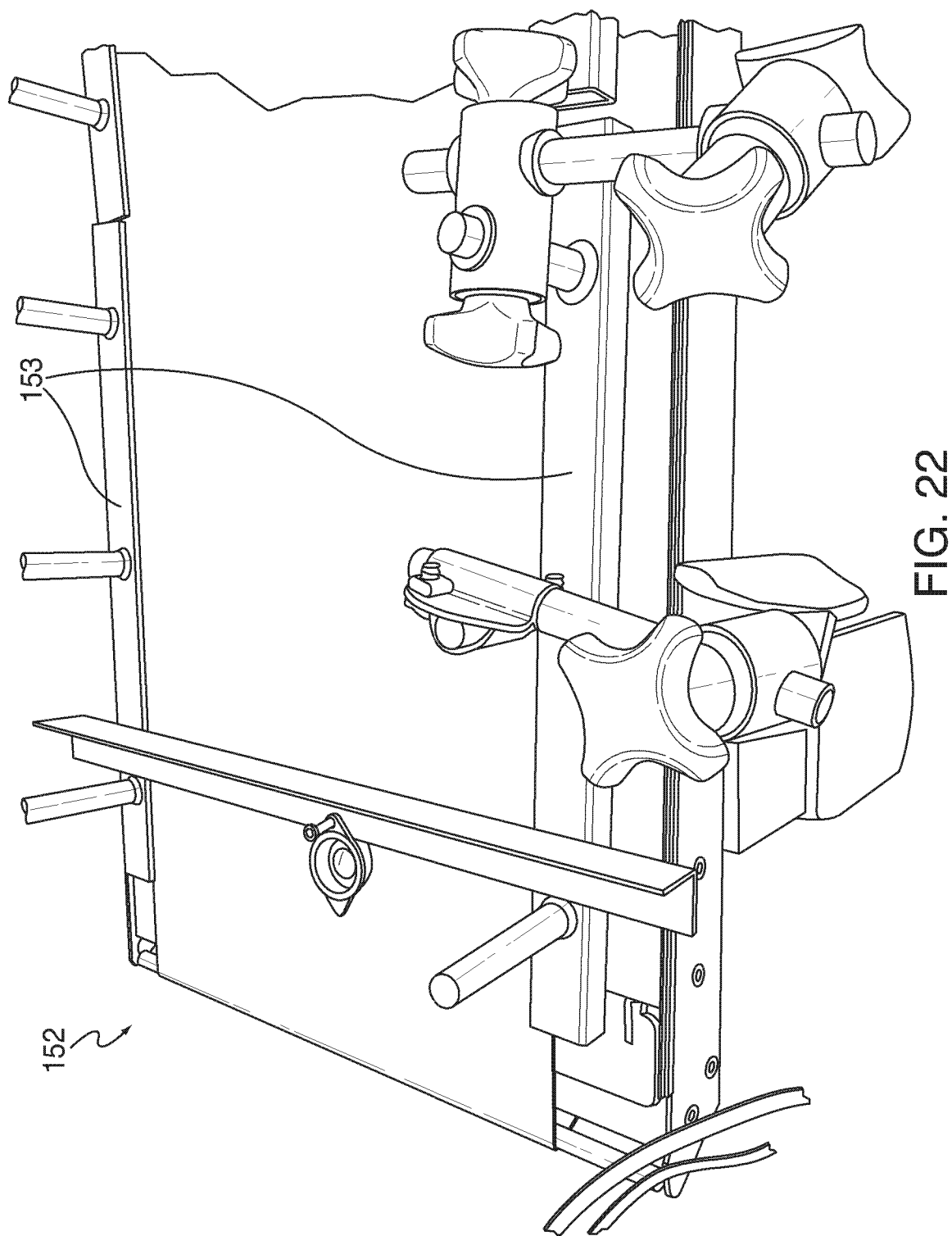
FIG. 22 is another view of the conveyor.
Figure 23:
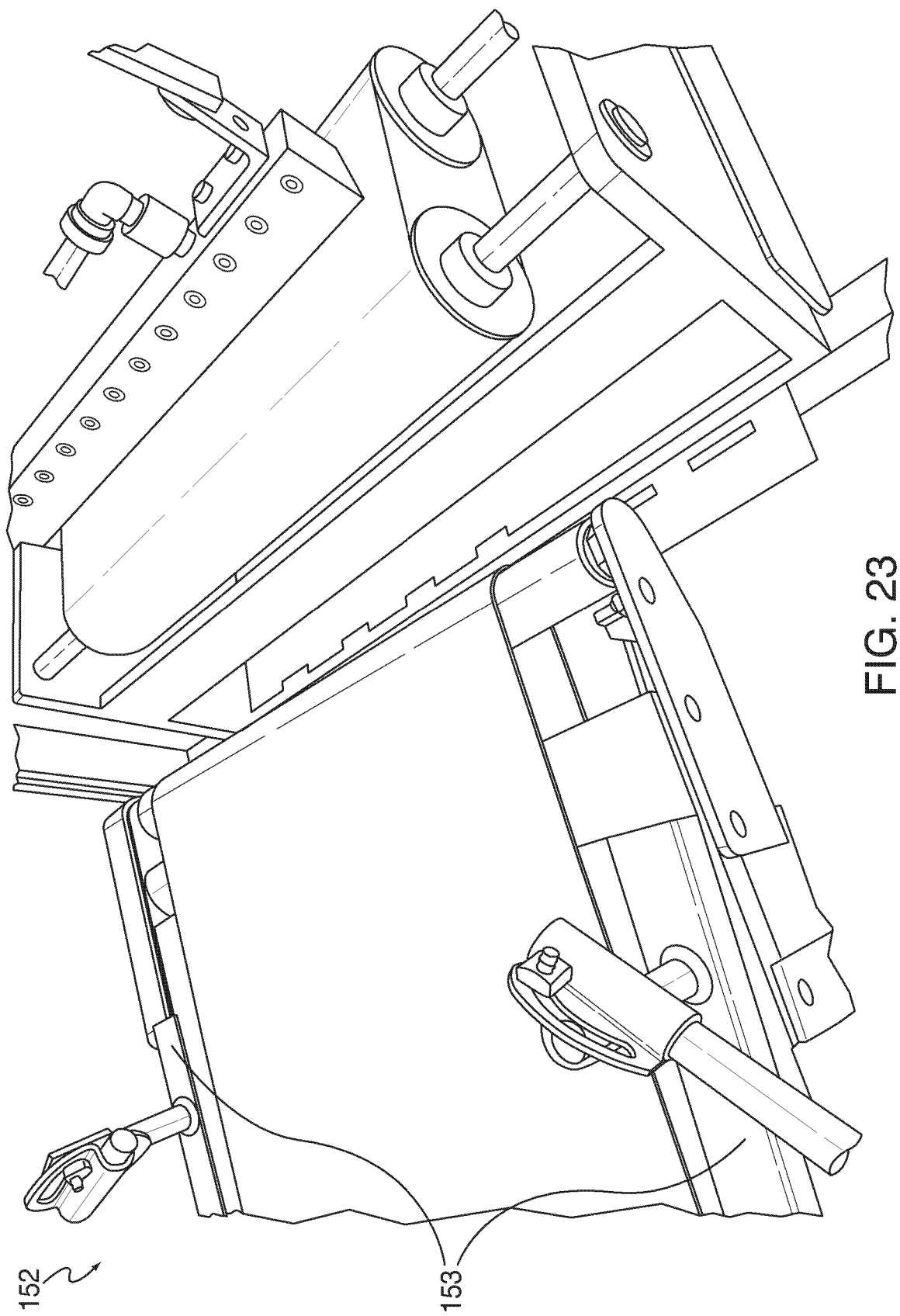
FIG. 23 is another view of the conveyor.
Figure 24:
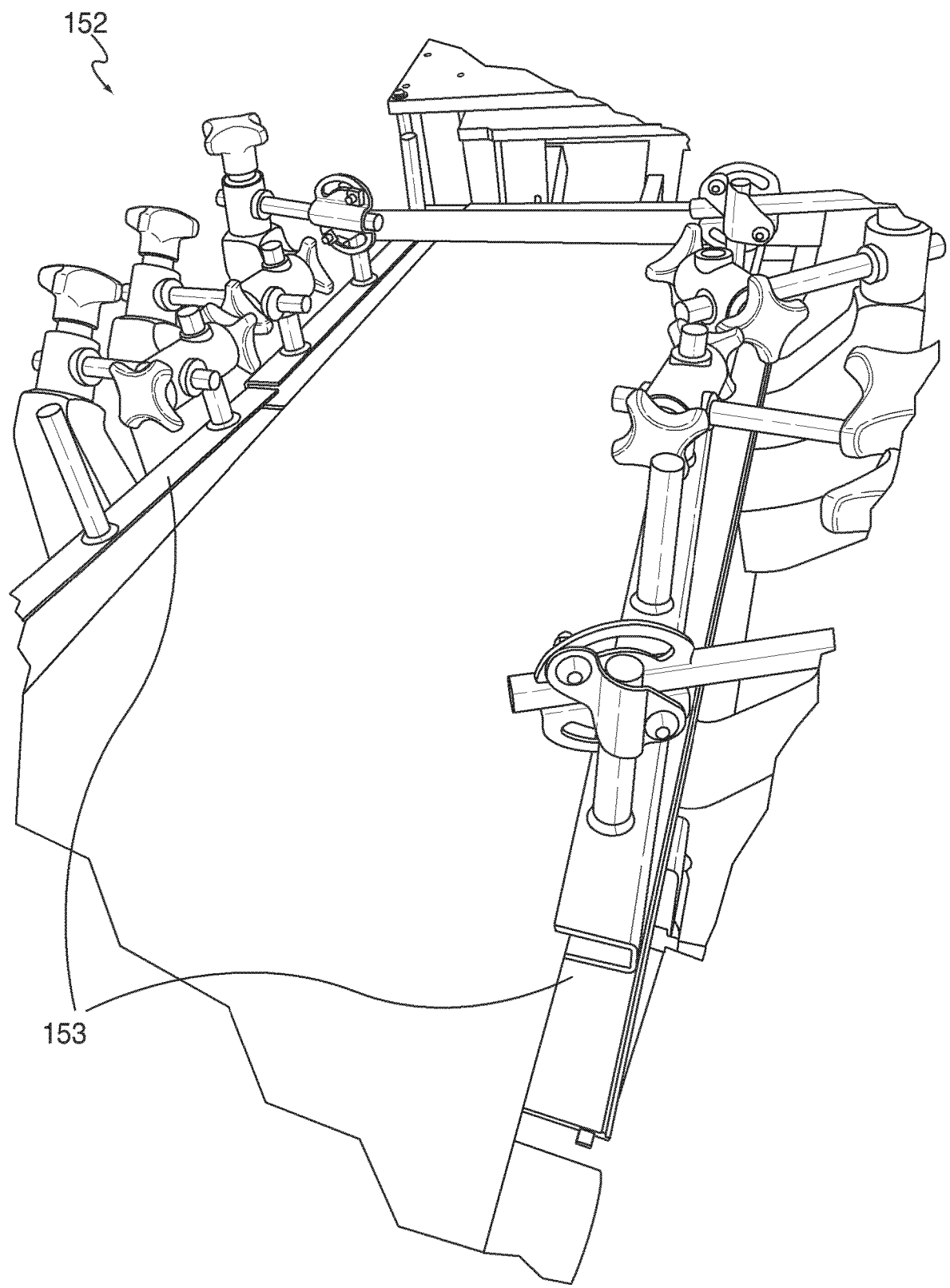
FIG. 24 is another view of the conveyor.
Figure 25:
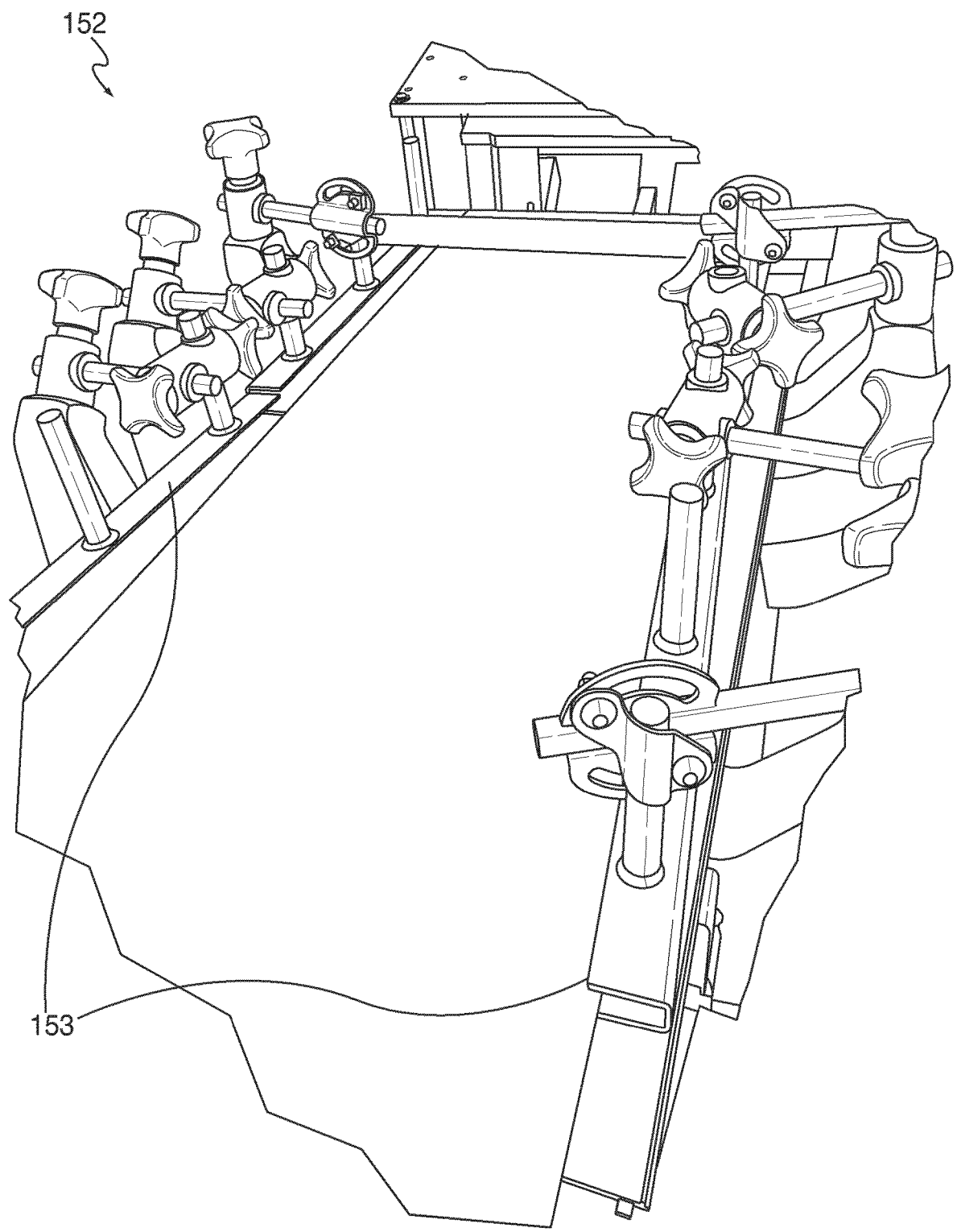
FIG. 25 is another view of the conveyor.

FIG. 19 shows a sheet 101 as it is about to enter the powder system 500. FIG. 20 shows a sheet 101 as it exits the powder system 500.

FIGS. 21-25 illustrate an example conveyor 152 with channels 153. The conveyor conveys the substrate sheets out of the powder system 500. The channels 153 align the sheet 101 (for example if a rectangular sheet is not rectilinear with respect to the conveyor 152).

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A powder system apparatus for depositing powder in a printing system, and for removing and recycling excess powder, comprising:
   a vibrating trough for depositing powder downward onto a printing substrate;
   a first volume above the vibrating trough that comprises a two-valve system for adding powder downward into the vibrating trough, the two-valve system comprising a first top flap and a second bottom flap configured such that both the top and bottom flaps cannot both be open at the same time, and further configured so that the top flap opens in a first horizontal orientation to one side, and the bottom flap opens in a second horizontal orientation to another side, where the first and second horizontal orientations are opposite one another;
   a vacuum system constructed to remove excess powder that does not adhere to the printing substrate; and
   a cyclone system above the first volume and connected to receive excess powder from the vacuum system and, through downward helical flow of the excess powder, to bring the excess powder downward toward the first volume that comprises the two-valve system.

2. The apparatus of claim 1, wherein the apparatus further comprises:
   a collector in which powder accumulates disposed below the cyclone system and above the first volume, the collector not disrupting the helical flow of powder, the collector further allowing downward entry of the excess powder into the first volume.

3. The apparatus of claim 2, wherein the cyclone system causes helical airflow, using airflow tangent to an inner cyclone surface to cause downward movement of powder.

4. The apparatus of claim 1, wherein a conveyor conveys a substrate to the powder system apparatus.

5. The apparatus of claim 4, wherein the conveyor comprises channels to align the substrate with the conveyor.

6. The apparatus of claim 1, wherein the two-valve system comprises:
   the first top flap having a flange and a gasket, connected to a first chamber and to a first hinge, the first hinge allowing the first top flap to open to the one side; and
   the second bottom flap located below the first top flap, having a flange and gasket, connected to a second chamber and to a second hinge, the second hinge allowing the second bottom flap to open to the another side horizontally opposite the one side.

7. The apparatus of claim 6, further comprising:
   a mechanism to open and close the first top flap and to open and close the second bottom flap.

8. The apparatus of claim 7, wherein a springs is coupled to both the first top flap and second bottom flap in a manner that ensures that both flaps are never simultaneously open.

9. The apparatus of claim 7, wherein when the second bottom flap opens, powder goes down into the vibrating trough.

10. The apparatus of claim 6, wherein when the first top flap opens, powder propagates down from the first chamber and accumulates into the second chamber.

11. The apparatus of claim 1, further comprising a computer implementing a method comprising the steps of:
    sensing when a new sheet of printing substrate enters the powder system apparatus;
    turning on vibration of the vibrating trough to dispense powder on the sheet;
    turning off vibration of the vibrating trough while the sheet exits the powder system apparatus; and
    waiting for a next sheet to enter the powder system apparatus.

12. The apparatus of claim 11, wherein the computer-implemented method further comprises repeating the steps during additive manufacturing of a 3D object.

* * * * *